United States Patent
Xu et al.

(10) Patent No.: US 10,620,850 B1
(45) Date of Patent: Apr. 14, 2020

(54) CACHING TECHNIQUES DUPLICATING DIRTY DATA IN SECONDARY CACHE

(71) Applicant: EMC IP Holding Company LLC, Hopkinton, MA (US)

(72) Inventors: Xinlei Xu, Beijing (CN); Liam Xiongcheng Li, Beijing (CN); Lifeng Yang, Beijing (CN); Jian Gao, Beijing (CN); Lili Chen, Hopkinton, MA (US); Ruiyong Jia, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 360 days.

(21) Appl. No.: 15/086,390

(22) Filed: Mar. 31, 2016

(51) Int. Cl.
| | |
|---|---|
| *G06F 3/00* | (2006.01) |
| *G06F 12/00* | (2006.01) |
| *G06F 3/06* | (2006.01) |
| *G06F 12/0893* | (2016.01) |
| *G06F 12/084* | (2016.01) |
| *G06F 12/0897* | (2016.01) |

(52) U.S. Cl.
CPC .......... *G06F 3/0619* (2013.01); *G06F 3/067* (2013.01); *G06F 3/0644* (2013.01); *G06F 3/0656* (2013.01); *G06F 3/0689* (2013.01); *G06F 12/084* (2013.01); *G06F 12/0893* (2013.01); *G06F 12/0897* (2013.01); *G06F 2212/1032* (2013.01); *G06F 2212/621* (2013.01)

(58) Field of Classification Search
None
See application file for complete search history.

(56) References Cited

U.S. PATENT DOCUMENTS

| | | | | |
|---|---|---|---|---|
| 5,826,052 A | * | 10/1998 | Stiles | ........... G06F 12/0811 712/205 |
| 6,385,697 B1 | * | 5/2002 | Miyazaki | ........... G06F 12/0897 711/128 |
| 8,966,170 B2 | * | 2/2015 | Ish | ........... G06F 12/0871 365/205 |
| 2003/0149845 A1 | * | 8/2003 | Fu | ........... G06F 12/0891 711/144 |

(Continued)

OTHER PUBLICATIONS

Xinlei Xu, et al., "Caching Techniques," U.S. Appl. No. 14/868,512, filed Sep. 29, 2015.

(Continued)

*Primary Examiner* — Reginald G Bragdon
*Assistant Examiner* — Michael L Westbrook
(74) *Attorney, Agent, or Firm* — Muirhead and Saturnelli, LLC

(57) ABSTRACT

Described are techniques for data caching. Dirty cached data of a first logical address may be stored in a secondary cache included in multiple caching layers. The multiple caching layers may also include a primary data cache. Two copies of the dirty cached data may be stored in two different cache pages on two different physical devices of the secondary cache. The two cache pages may be marked as dirty indicating that data stored in the cache pages of the secondary cache is a more recent copy of data stored at the first logical address than other data stored on first non-volatile physical storage. Clean cached data of a second logical address may also be stored in the secondary cache where a single copy of the clean cached data is stored in physical storage of the secondary cache.

20 Claims, 17 Drawing Sheets

(56) References Cited

U.S. PATENT DOCUMENTS

| | | | | |
|---|---|---|---|---|
| 2003/0200388 | A1* | 10/2003 | Hetrick | G06F 12/0866 |
| | | | | 711/114 |
| 2008/0059707 | A1* | 3/2008 | Makineni | G06F 12/0897 |
| | | | | 711/122 |
| 2012/0246383 | A1* | 9/2012 | Asano | G06F 12/0246 |
| | | | | 711/102 |
| 2013/0198448 | A1* | 8/2013 | Ish | G06F 12/0871 |
| | | | | 711/113 |
| 2014/0068181 | A1* | 3/2014 | Mridha | G06F 12/0871 |
| | | | | 711/114 |
| 2014/0089558 | A1* | 3/2014 | Baderdinni | G06F 12/0871 |
| | | | | 711/102 |
| 2014/0173379 | A1* | 6/2014 | Loh | G06F 11/1064 |
| | | | | 714/764 |
| 2014/0181402 | A1* | 6/2014 | White | G06F 12/0897 |
| | | | | 711/122 |
| 2016/0179672 | A1* | 6/2016 | Dell | G06F 12/0806 |
| | | | | 711/122 |

OTHER PUBLICATIONS

White Paper, "VNX Fast Cache," VNX5100, VNX5300, VNX5500, VNX5700, & VNX7500, A Detailed Review, Dec. 2013, 25 pps.

\* cited by examiner

US 10,620,850 B1

CACHING TECHNIQUES DUPLICATING DIRTY DATA IN SECONDARY CACHE

BACKGROUND

Technical Field

This application generally relates to caching.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of techniques herein is a method of caching data comprising: storing dirty cached data of a first logical address in a secondary cache, wherein said secondary cache and a primary data cache are included in a plurality of caching layers, wherein a first copy of the dirty cached data is stored in a first cache page on a first physical device of the secondary cache and a second copy of the dirty cached data is stored in a second cache page on a second physical device of the secondary cache, said first physical device and said second physical device being different physical devices, said first cache page and said second cache page each being marked as dirty indicating that data stored in said each cache page of the secondary cache is a more recent copy of data stored at the first logical address than other data stored on first non-volatile physical storage; and storing clean cached data of a second logical address in the secondary cache, wherein a single copy of the clean cached data is stored in a third cache page on physical storage of the secondary cache. The dirty cached data may be write data written to the first logical address specified as a target location of a write operation. The clean cached data may be synchronized with data stored on the first non-volatile physical storage providing back-end physical storage mapped to the second logical address. The first non-volatile storage may be back-end physical storage that includes a physical storage portion mapped to the first logical address, and wherein said first non-volatile storage may not be included in any of the plurality of caching layers. The method may include destaging the first dirty cached data to the first non-volatile storage; removing the second copy of the dirty cached data; marking the second cache page storing the second copy as free and available for storing other cached data of the secondary cache; and marking the first dirty data cached data as clean cached data indicating that the first cache page includes data synchronized with data stored on a portion of the first non-volatile storage providing back-end physical storage that is mapped to the first logical address. A cache hit may be determined with respect to the secondary cache when an I/O operation directed to a logical address has its data stored in the secondary cache. A cache miss may be determined with respect to the secondary cache when an I/O operation directed to a logical address does not have its data stored in the secondary cache. The method may include receiving a write operation that stores first write data to the second logical address; storing the first write data in the primary data cache; performing processing to destage the first write data of the second logical address comprising: determining whether there is a cache hit with respect to the secondary cache for the second logical address; responsive to determining there is a cache hit with respect to the secondary cache for the second logical address, performing second processing comprising: storing the first write data in the third cache page; storing the write data in a fourth cache page of the secondary cache, wherein said third cache page and said fourth cache page are each on a different physical storage device of the secondary cache; marking the first write data stored in the third cache page and the fourth cache page as second dirty cached data indicating that the first write data stored in the third and the fourth cache pages of the secondary cache is a more recent copy of data stored at the first logical address than other data stored on first non-volatile physical storage; and sending the first write data to first non-volatile storage for destaging. The secondary cache may be a flash disk cache including a plurality of flash-based storage devices. The dirty cached data may be stored in the first cache page on a first of the plurality of flash-based storage devices and the dirty cached data may be stored in a second of the plurality of flash-based devices different from the first flash-based storage device. Each cache page of the secondary cache stores an amount of data denoted by a first amount, and wherein the method may also include receiving a first write operation that writes first data to a target logical address; determining whether the first data has a size larger than the first amount; responsive to determining the first data has a size larger than the first amount, partitioning the first write operation into a plurality of write operations each writing a different portion of first data wherein said different portion has a size that is equal to or less than the first amount; and processing each of the plurality of write operations and, for each of said plurality of write operations, determining whether to cache the different portion of the first data, as written by said each write operation, in the secondary cache. The method may include receiving write data to store in the secondary cache; determining that there are no free pages in the secondary cache;

responsive to determining there are no free pages in the secondary cache, selecting a particular cache page of the secondary cache wherein the particular cache page includes clean cache data synchronized with the first non-volatile storage; and storing the write data to the selected particular cache page. Selecting may select the particular cache page in accordance with an age associated with current data stored in the particular cache page prior to storing the write data. The particular cache page may be a least recently used cache page of a plurality of cache pages.

In accordance with another aspect of techniques herein is a computer readable medium comprising code stored thereon that, when executed, performs a method of caching data comprising: storing dirty cached data of a first logical address in a secondary cache, wherein said secondary cache and a primary data cache are included in a plurality of caching layers, wherein a first copy of the dirty cached data is stored in a first cache page on a first physical device of the secondary cache and a second copy of the dirty cached data is stored in a second cache page on a second physical device of the secondary cache, said first physical device and said second physical device being different physical devices, said first cache page and said second cache page each being marked as dirty indicating that data stored in said each cache page of the secondary cache is a more recent copy of data stored at the first logical address than other data stored on first non-volatile physical storage; and storing clean cached data of a second logical address in the secondary cache, wherein a single copy of the clean cached data is stored in a third cache page on physical storage of the secondary cache. The dirty cached data may be write data written to the first logical address specified as a target location of a write operation. The clean cached data may be synchronized with data stored on the first non-volatile physical storage providing back-end physical storage mapped to the second logical address. The first non-volatile storage may be back-end physical storage that includes a physical storage portion mapped to the first logical address, and wherein the first non-volatile storage may not be included in any of the plurality of caching layers. The method may include destaging the first dirty cached data to the first non-volatile storage; removing the second copy of the dirty cached data; marking the second cache page storing the second copy as free and available for storing other cached data of the secondary cache; and marking the first dirty data cached data as clean cached data indicating that the first cache page includes data synchronized with data stored on a portion of the first non-volatile storage providing back-end physical storage that is mapped to the first logical address.

In accordance with another aspect of techniques herein is a system comprising: a processor; and a memory comprising code stored thereon that, when executed, performs a method of caching data comprising: storing dirty cached data of a first logical address in a secondary cache, wherein said secondary cache and a primary data cache are included in a plurality of caching layers, wherein a first copy of the dirty cached data is stored in a first cache page on a first physical device of the secondary cache and a second copy of the dirty cached data is stored in a second cache page on a second physical device of the secondary cache, said first physical device and said second physical device being different physical devices, said first cache page and said second cache page each being marked as dirty indicating that data stored in said each cache page of the secondary cache is a more recent copy of data stored at the first logical address than other data stored on first non-volatile physical storage; and storing clean cached data of a second logical address in the secondary cache, wherein a single copy of the clean cached data is stored in a third cache page on physical storage of the secondary cache.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
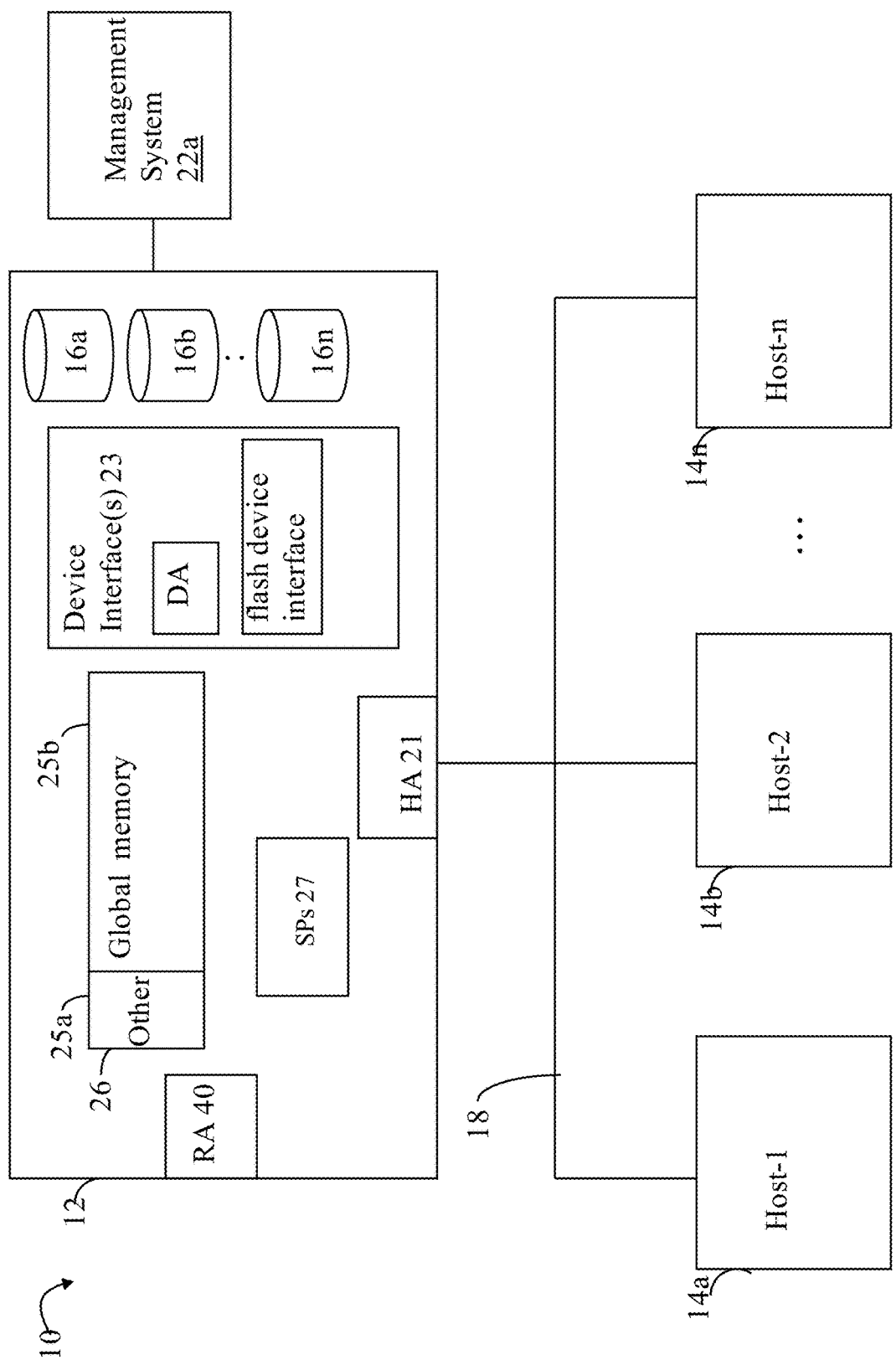
FIG. 1 is an example of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

As known in the art, a LUN may have physical storage provisioned on one or more PDs of the data storage system where the LUN has a logical address space or range. Logical addresses of the LUN may be mapped to physical storage locations on the PDs. The logical address range for the LUN may, for example, range from a starting logical address of 0 to a maximum logical address that varies depending on the capacity of the particular LUN. In one embodiment, each logical address may denote a logical block address or offset from the starting LBA of 0. Each single block, such as LBA 0, may denote a block or generally some amount of storage that may vary with data storage system (e.g., block size may vary with data storage system).

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

In connection with a data storage system such as described herein, an I/O request may be a read request to read data. The read request may be received at the data storage system at a port of a front-end component of the data storage system (such as one of the HAs as described elsewhere herein). In terms of processing a read request, a determination may be made as to whether all the requested read data is in cache (e.g., a cache hit). If so, the read request may be characterized as a read hit. In such cases of a read hit, the front-end component, such as the HA, receiving the read request may service the read request by retrieving all requested read data from the cache and returning the requested read data to the host. If all the requested read data is not in cache, the read may be characterized as a read miss (e.g., cache miss) whereby processing is performed to retrieve from physical storage any portion of the requested data that is not currently in cache. As described above, one or more DAs may perform processing to retrieve from physical storage any portion of the requested data not currently in cache. Once all the requested read data is in cache, the front-end component, such as the HA, receiving the read request may service the read request by retrieving all requested read data from the cache and returning the requested read data to the host. In this manner, a front-end component may service read requests using data that is already stored in cache prior to processing the read request, as well as using data that is brought into cache from physical storage responsive to receiving the read request.

Storing such data in cache is performed with the goal of servicing subsequent I/Os using cached data without having to retrieve the data from physical storage. In an embodiment in accordance with techniques herein, processing may be performed as just described to unconditionally cache reads as a result of a cache miss and to execute a dependent sequence of steps whereby the DA writes read miss data (retrieved from physical storage) to cache and the HA then retrieves the requested data from the cache to return to the requesting host.

In connection with write operations, write data received at the data storage system may be stored in cache and then written out later to physical storage, such as written to backend physical storage devices by a DA. Once the write data is written into cache, the data may be marked as write pending (WP) in cache denoting that the cached write data is the most recent copy of the data and needs to be destaged to backend physical storage devices. The cache location including the WP data may marked as dirty thereby indicating that the cache location includes valid data and contains the most recent copy of the data but has not yet been synchronized with the copy on physical storage of the back end. Once the write data is written to cache, the data storage system may send an acknowledgement to the host that the write operation has been completed even though the write data may not have yet been destaged from cache to the backend physical storage devices. Once the WP data has been destaged from cache to physical storage, the cache location including the write data may be characterized as clean where the cache location is valid and contains a copy of write data that has been synchronized with backend physical storage.

Figure 2:
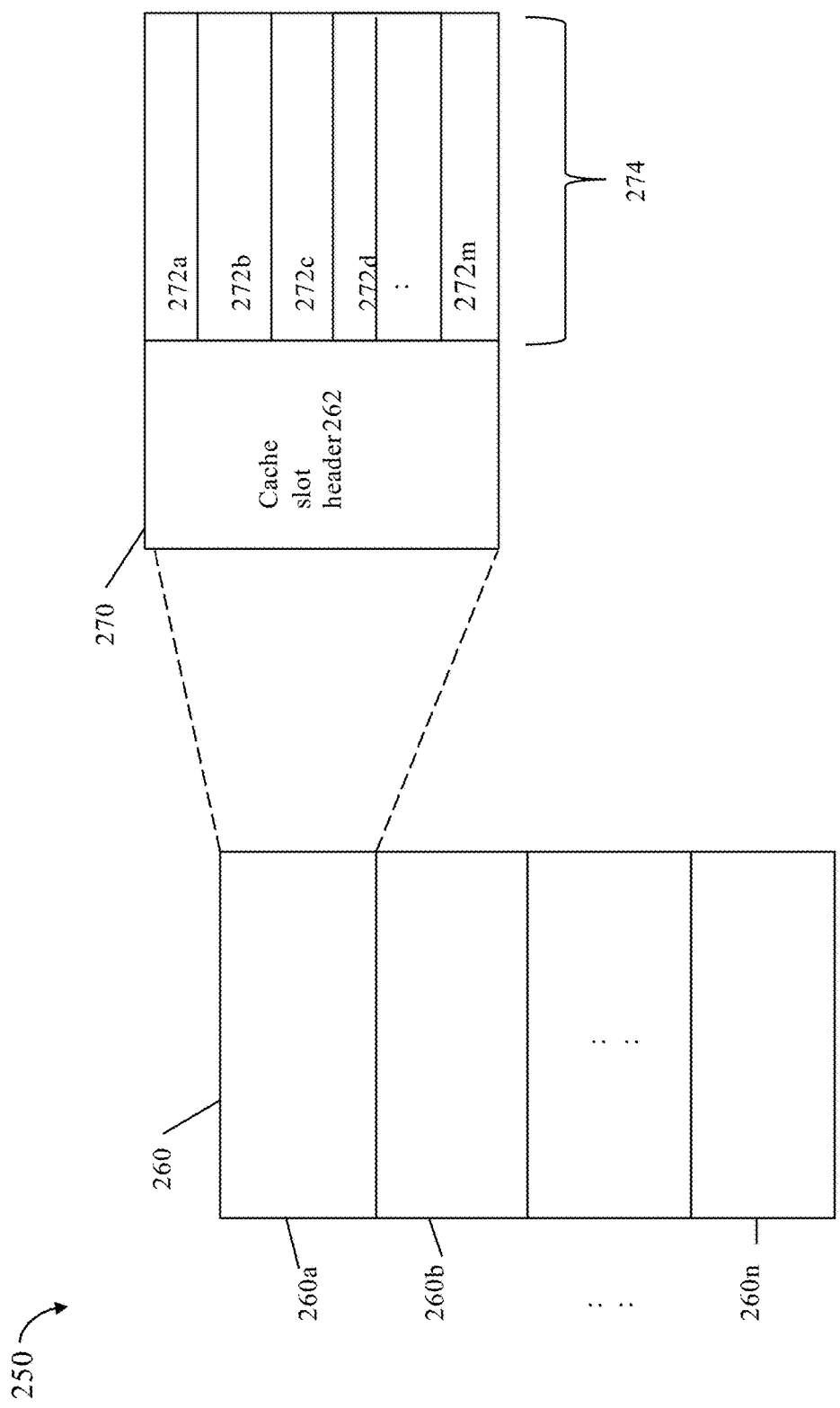
FIG. 2 is an example illustrating in more detail a representation of information that may be included in a primary data cache in an embodiment in accordance with techniques herein.

Referring to FIG. 2, shown is an example illustrating a logical representation of a cache that may be used in an embodiment in accordance with techniques herein. The cache in FIG. 2 may denote generally a data cache that may be used as part of a plurality of cache layers in an embodiment of a data storage system described in more detail below. The cache such as illustrated in FIG. 2 may be, for example, a DRAM cache that is primary or first caching layer in the plurality of caching layers described in more detail elsewhere herein.

In the example 250, element 260 may represent the memory or storage used as the cache which is partitioned into cache slots 260a-260n. It should be noted that the example 250 is a logical representation of a cache that may be implemented using any suitable data structure(s) known in the art. Each of the cache slots 260a-n may contain varying amounts of write pending data. Consistent with description elsewhere herein, write pending data may be user data received in connection with a write operation where the user data has been stored in cache and is waiting to be destaged or written out to physical storage (e.g., element 212 of FIG. 5A) from cache. Element 270 provides additional detail of single cache slot 260a Cache slot 260a may include a cache slot header 262 and cache slot data 274. The cache slot data 274 illustrates that a single cache slot of data may further include multiple portions 272a-m each of which may or may not include write pending data and each of which may or may not include any cached data. The cache slot header 262 may include additional information regarding the cached data stored in 274. For example, the header 272 may denote whether the data cached in each of the portions 272a-m is write pending data.

It should be noted that the particular granularity or smallest unit of storage for storing cached data may vary with embodiment. For example, each of the portions 272a-m may denote a smallest unit of storage for storing cached data. Additionally, the particular number of portions in a cache slot may also vary with embodiment.

Although not illustrated in FIG. 2 for simplicity and as known by those of ordinary skill in the art, an embodiment may store additional information for each of the cache slots regarding the data stored in area 274 of each such cache slot. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the cache 260 to retrieve and/or store data from the cache. For example, the HA may manage and/or use information mapping a LUN and LUN offset to a cache location including data stored at the LUN offset on the particular LUN. The DA may manage and/or use information mapping a PD and offset on the PD to a cache location including data stored at the offset on the particular PD. In one embodiment, for example, the foregoing mapping of a LUN location so its physical device location may be included in the location information of MD associated with user data described in more detail elsewhere herein.

Figure 3:
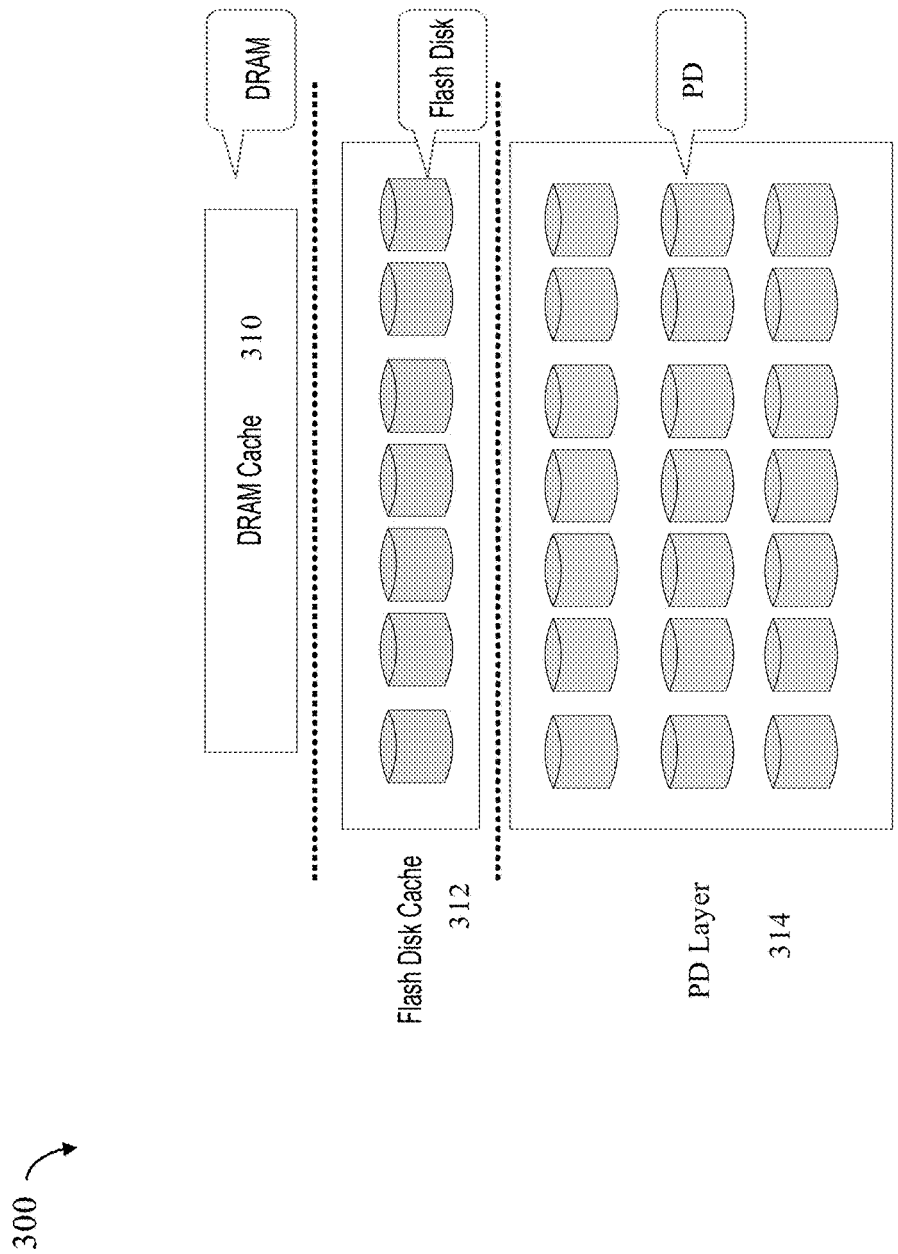
FIG. 3 is an example illustrating a plurality of layers that may be included in an I/O path in an embodiment in accordance with techniques herein.

Referring to FIG. 3, shown is an example illustrating a plurality of layers including caches and physical backend storage in an embodiment in accordance with techniques herein. The example 300 includes DRAM cache 310, flash disk cache 312, and a backend physical storage device (PD) layer 314. The flash disk cache 312 may include flash-based storage devices or other solid state storage. The PD layer 314 may include, for example, rotating disk drives that provide non-volatile storage for data and may be organized into groups such as RAID groups providing the backend PDs which may be accessed, for example, by DAs when reading data from the PDs (such as to read data from the PD and then store such read data in the DRAM cache 310 cache to service a read miss) and/or when writing data to the PDs (such as to destage data from DRAM cache 310). It should be noted that the PDs of 314 may also be referred to herein as backend PDs, backend non-volatile storage.

In at least one embodiment of a data storage system in the illustrated hierarchy of FIG. 3, the Flash Disk Cache 312 is under the DRAM or general data cache 310, and below the Flash Disk Cache 312 are backend PDs 314. Generally, the DRAM cache 310, also referred to herein as the cache or data cache, may be the primary or highest caching layer such as mentioned above where read and write data are placed on first instance in connection with an I/O operation. Thus, in one aspect, the DRAM cache 310 may denote a level 1 (L1) primary cache and the Flash disk cache 312 may denote a level 2 (L2) secondary cache. Element 310 may denote, for example, the cache to which data is first written when write operations are received by the host such as described above. Generally, the layers of FIG. 3 may be ranked, in terms of relative performance, from highest to lowest, as follows: DRAM cache 310, the flash disk cache 312, and PDs 314. The Flash disk cache 312 may include flash-based storage devices. More generally, the flash disk cache 312 may include a form of solid state or other storage that may be non-volatile or volatile which fits in with the above-mentioned relative performance ranking.

Flash disk cache 312 may be characterized as a storage-system component that improves performance by transparently storing or promoting data from PDs 314 into Flash Disk media (Flash disk) of layer 312, so that user requests for data can be served much faster than if retrieved from PDs 314. PDs of layer 314 may be used to store all the user data and serve the I/O requests which cannot be serviced by using data from either DRAM cache 310 or Flash disk cache 312. Generally, as mentioned above, PDs of layer 314 provide the slowest response time of all layers 310, 312 and 314 when there is a need to access the PD to read data therefrom and/or write data thereto.

Data may be promoted from PDs 314 to the flash cache 312 based on "temperature" related to I/O activity or frequency of access (e.g. number of reads and/or writes for the data). Placing or promoting data chunks from PDs 314 is not dependent on whether the data is already in DRAM cache 310. In at least one embodiment, the PDs 314 may denote rotating disk drives or more generally PDs having a lower performance than the flash-based drives of layer 312. In at least one embodiment, data may be stored in the Flash disk cache in chunks, such as chunks that are each 64 KB in size. It should be noted that in some systems, the backend physical storage devices may also include flash-based storage devices having an expected level of performance similar to those physical storage devices of the Flash disk cache 312. In such cases, an embodiment may decide not to use the Flash disk cache 312 with user data stored on back-end physical storage devices which are flash-based since there is similar performance when accessing data from either the back-end physical storage devices or Flash disk cache 312. Rather, an embodiment may selectively choose to enable or use the Flash disk cache 312 in connection with user data that will more generally see a performance benefit in obtaining data from the Flash disk cache rather than back-end storage devices. Thus, generally, the PDs of 314 may include rotational disk drives, or more generally, PDs having an excepted level of performance that is less than the expected level of performance when accessing data from drives or physical storage comprising the Flash disk cache 312.

In a manner similar to that as described in connection with FIG. 2, a memory map or mapping information may be maintained by the Flash disk cache layer 312 to indicate whether a particular data portion located at a particular LUN and offset (e.g., LBA) is currently stored in the Flash disk cache and if so, the particular location in the Flash disk cache where such data is located. In addition to the mapping information, the Flash disk cache 312 may also store information indicating whether the data stored in a cache page of the Flash disk cache 312 is dirty thereby denoting that the cache location includes valid data and contains the most recent copy of the data but has not yet been synchronized with the copy on of the PD layer 314. Generally, in addition to mapping information, the Flash disk cache layer 312 may use a structure referred to herein as the shadow cache to store other metadata that may be used by the Flash disk cache 312. For example, the shadow cache may store information regarding the access frequency of different data portions located at various LUN locations where such LUNs have storage provisioned from PDs of the PD layer 314. Thus, the frequency of access information in the shadow cache may be used to determine when to promote data from the PD layer 314 to the Flash disk cache 312.

It should also be noted that the Flash disk cache layer 312 may also experience cache or read hits and also cache or read misses with respect to whether requested read data is stored in the Flash disk cache 312. Thus, the Flash disk cache 312 may have associated states and experience cache hits and misses in a manner similar to the DRAM cache 310 used as the primary or level 1 cache in the hierarchy of FIG. 3.

Generally, the first time data is accessed for read or write, the data is stored in the DRAM cache 310 as the primary data cache in connection with I/O processing of the data path. Processing may be performed to monitor how frequently a particular data portion is accessed (such as within a specified period of time) to determine whether such observed access frequency reaches a threshold level to warrant storing such data also in the Flash disk cache layer 312. The shadow cache described above may be used by the Flash disk to track such access frequency for data at different LUN locations and determine when to promote a data portion stored at a particular LUN location from PDs 314 to the Flash disk cache 312.

In at least one embodiment the DRAM Cache 310 may cache the hottest (e.g., most frequently accessed) data and Flash Disk Cache 312 may cache data that is relatively less frequently accessed than data of the DRAM cache 310.

In connection with processing an I/O operation such as a read operation, processing may first determine whether the requested read data is in the primary data cache, such as the DRAM cache 310. If so, the requested data is read from cache and returned to the requester. If the requested read data is not in the primary data cache (e.g., DRAM cache 310), processing may determine whether the requested data is stored in the Flash disk cache. If so, the requested data is obtained from the Flash disk cache 312 and returned to the requester. If the requested data is not in the Flash disk cache 312, the requested data is obtained from PDs 314, may be stored in the DRAM cache 310 and then returned to the requester. Additionally, depending on frequency of access as described elsewhere herein, the data may also be stored in the Flash disk cache.

In connection with write operations, the write data is written to the primary data cache, such as the DRAM cache 310, and an acknowledgement is returned to the requester that the write operation has complete. At some later point in time, processing may be performed to destage the write data from the DRAM cache 310. As mentioned elsewhere herein, data, such as the write data being destaged, may be promoted to the Flash disk cache if there has been sufficient frequency of access to such write data. Thus, as part of destaging the write data from the DRAM cache 310, processing may include determining whether the write data has been promoted to the Flash disk cache. If so, the write data is stored in the Flash disk cache and then later may be flushed from the Flash disk cache to the PDs 314. If the write data is not promoted to the Flash disk cache, the data is written out from the DRAM cache directly to the PDs 314.

In some embodiments, it may be that write caching to the primary data cache, such as DRAM cache 310, is disabled whereby caching may be performed with respect to only the Flash disk cache layer 312. In such a case, the write data received is not stored in the DRAM cache 310 when received and rather the write operation data processing proceeds directly to the Fast cache layer where a determination is made as to whether to store the data in the Flash disk cache. As noted elsewhere herein, such a determination may be made based on whether there has been a sufficient level of access frequency (e.g., above a specified threshold level of activity) to the write data to warrant storing or promoting the write data to the Flash disk cache. If it is determined that the write data has not been promoted to the Flash disk cache, the write data is written directly to the PDs 314. Otherwise, if it determined that the write data has been promoted to the Flash disk cache, the write data is written to the Flash disk cache and then some time later may be flushed to the PDs 314.

In an embodiment in accordance with techniques herein, the I/O path denoting the processing path taken in connection with processing a user or host I/O operation may pass through the layers such as illustrated in FIG. 3. Processing may be performed at the various layers as described herein to determine what steps are performed in connection with processing the I/O operation.

Figure 4:
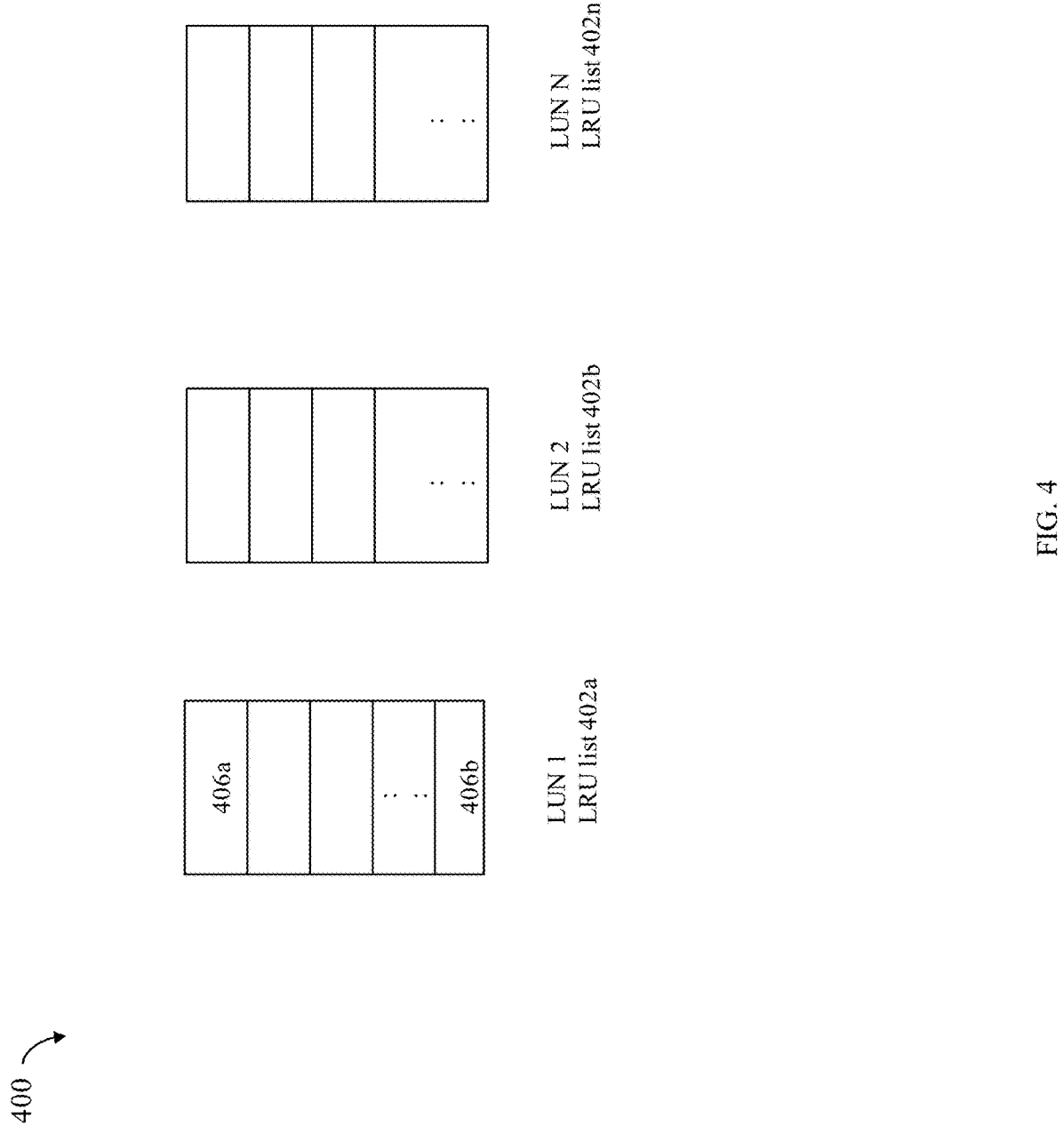
FIGS. 4 and 14 are examples of structures that may be used in an embodiment in accordance with techniques herein.

With reference to FIG. 4, in at least one embodiment, the Flash disk cache may partition its cached pages of data on a per-LUN basis whereby each LUN's cached pages may be grouped together logically in connection with a data structure such as illustrated in the example 400 of FIG. 4. For example, FIG. 4 includes lists 402*a-n* denoting logical groupings of cache pages where each such logical grouping 402*a-n* includes cache pages containing data for a particular LUN having its data stored in the flash disk cache. Element 402*a* denotes a list of cached pages containing data in the Flash disk cache for LUN1. Element 402*b* denotes a list of cached pages containing data in the Flash disk cache for LUN2. Element 402*n* denotes a list of cached pages containing data in the Flash disk cache for LUN N.

Each of 402*a-n* may denote a structure linking together the cached pages of the Flash disk cache for a single LUN. Thus, for example, each entry such as 406*a* of 402*a* may denote a different cache page of the Flash disk cache 312 including cached data for LUN 1. In a similar manner, entries of each of LUN lists 402*b-n* also denote a different cache page of the Flash disk cache 312 including cached data for a particular LUN. Each of 402*a-n* may be any suitable data structure. For example, in one embodiment, each of 402*a-n* may be a doubly linked list data structure as known in the art. Additionally, each entry of a list, such as entry 406*a*, may denote a single cache page and may also include metadata regarding the cache page such as state information denoting whether the cached data of the cache page is dirty, the particular LBA or offset location(s) on the LUN corresponding to the data stored in the cache page, mapping information regarding the particular physical storage location in the flash disk cache where the cached data is stored (e.g., which PD and PD location in the flash disk cache contain the cached user data having a logical address of a LUN and LUN LBA), and the like, as described elsewhere herein. Entries in each of the LUN lists 402*a-n* may also ordered based on access frequency or temperature associated with the data cached in each cache page or list entry. For example, in one embodiment, entries of each list 402*a-n* may be ordered, from most recently used or accessed to least recently used (LRU) or accessed. For example with reference to 402*a*, entries in 402*a* may be ordered based on time since last accessed with the most recently used data at the top of the list and the least recently used data at the bottom of the list. To further illustrate, entry 406*a* may be the most recently used cached data for LUN 1 and entry 406*b* may be the least recently used cached data for LUN 1.

Additionally, information maintained for each entry of each list 402*a-n* may include an indicator as to whether the cached data page is dirty or clean. In at least one embodiment, the indication of whether each cached data page is dirty or clean may be reflected in an additional separate list, the dirty page list, maintained for each LUN.

At various points in time, data may be flushed or moved from the Fast disk cache to the back-end PDs 314. For example, one or more cache pages of data (for which Flash data cache promotion is currently scheduled or can be performed since the cached data as sufficient access frequency) may be flushed from the Fast disk cache. Such flushing may occur, for example, when there are no free or clean pages available in the Flash disk cache. In such instances when there are no free or clean pages, processing may be performed that includes selecting one or more cache pages including data to be flushed from the Flash disk cache 312 to the PDs 314.

As noted elsewhere herein, data stored in the Flash disk cache may be dirty or WP in that the cached data is the most recent or up to date copy of the user data and is more up to date than the copy stored on the PDs (e.g., the data stored in the Flash disk cache has not yet been synchronized with the copy stored on the PDs 314). In such an instance, flushing may include flushing dirty cache pages including such dirty data to the PDs 314. Once the dirty data has been written from the Flash disk cache to the PDs (whereby the PDs 314 now include the same most recent copy of the data as stored in the Flash disk cache), the cache disk page and associated data may be updated in status from dirty to clean.

Referring back to FIG. 3, the flash disk cache 312 may be characterized in one aspect as a read/write caching layer in which data may be stored for both reads and writes. Thus, an embodiment in accordance with techniques herein may include the flash cache to obtain higher performance for both read and write I/Os. Such techniques are described in more detail below. However, first reference is made to at least one data storage system not in accordance with techniques herein, where the flash disk cache may be implemented using a RAID-1 configuration for storing all data of both reads and writes. Various RAID (redundant array of independent disks or devices) levels and configurations or layouts are known in the art. Different RAID levels provide different levels and types of data protection. For example, RAID-1 provides data protection by mirroring data where each stored data item in a RAID-1 group of physical devices (PDs) is stored on two different PDs (e.g., a first copy on a first PD of the RAID-1 group and a second copy on a second PD of the RAID-1 group). RAID-1 provides data protection by storing two copies of each data item on different PDs whereby if one of the PDs storing the first copy fails, the second copy stored on a different second PD is still available.

Figure 5:
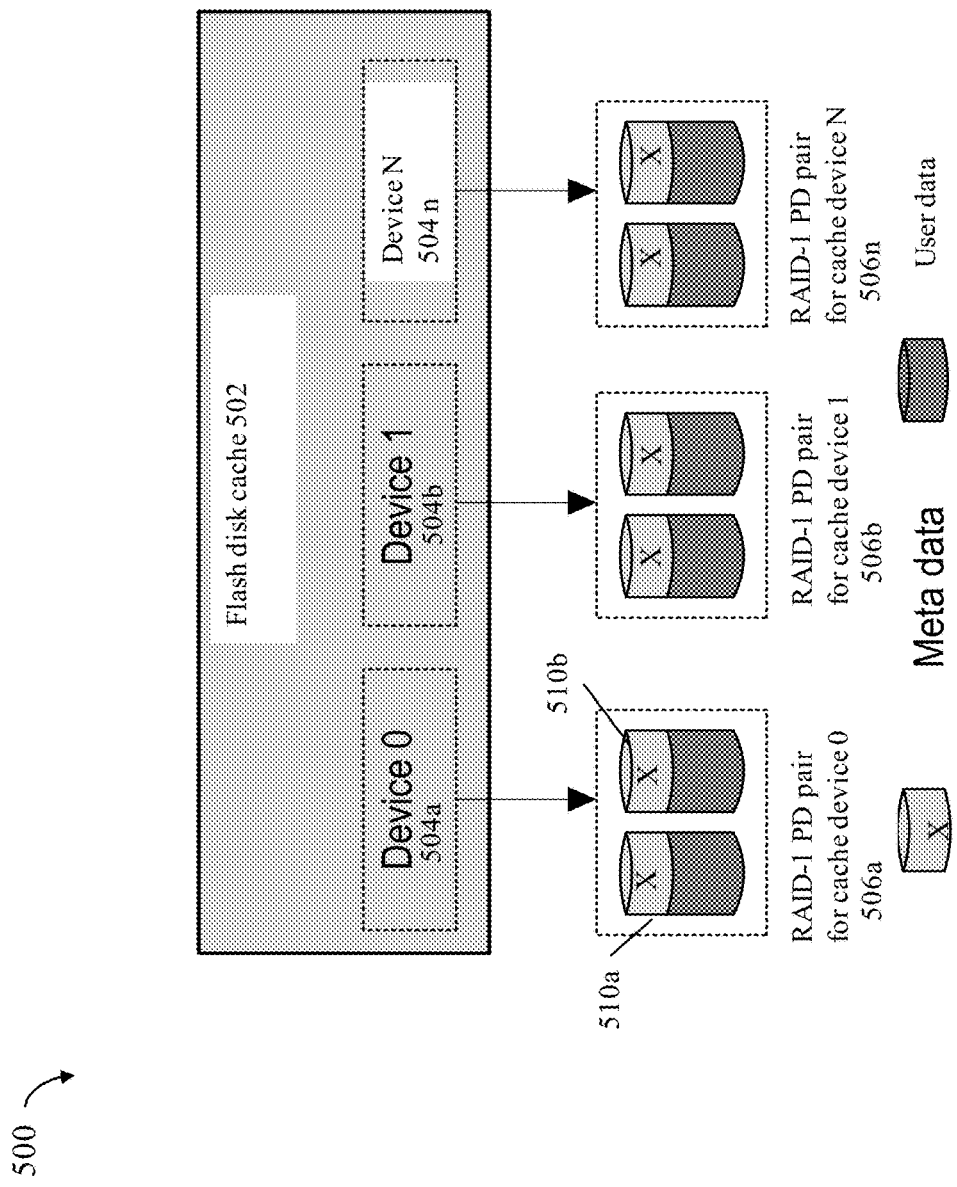
FIGS. 5 and 6 are examples illustrating a RAID-1 configuration for with a flash disk cache.

With reference to FIG. 5, shown is an example 500 illustrating a flash disk cache in which all data stored therein is in a RAID-1 configuration. The example 500 includes flash disk cache 502 configured to have N cache devices—Device 0 504*a*, Device 1 504*b*, . . . Device N 504N. Elements 504*a-n* may denote logical devices configured for caching (e.g., also referred to as cache/caching device or logical cache devices) having storage provisioned from RAID-1 physical device configurations 506*a-n*. Each cache device 504*a-n* may include user data and associated metadata regarding the page of cached data. In the example illustrated, each page of cached data may be 64 Kbytes and each page of cached data may have an associated 512 bytes of metadata. Each of the N cache devices 504*a-n* is a logical device having its data and metadata stored on a pair of PDs forming a RAID-1 group or configuration. Each of the PDs of 506*a-n* may be a flash-based physical storage device providing physical cache storage for the flash disk cache. For example, cache device 0 504*a* has its data and metadata stored on a pair of PDs 510*a* and 510*b*. Each of the PDs 510*a*, 510*b* may be a flash-based physical storage device providing physical cache storage for the flash disk cache. Each page of cache data stored on cache device 0 504*a* has a first copy of the cached data and its associated metadata stored on PD 510*a* and a second duplicate copy of the cached data and its associated metadata storage on PD 510*b*. Thus, PD 510*a* and PD 510*b* may mirror each other in terms of metadata and cached data stored on each PD.

Figure 6:
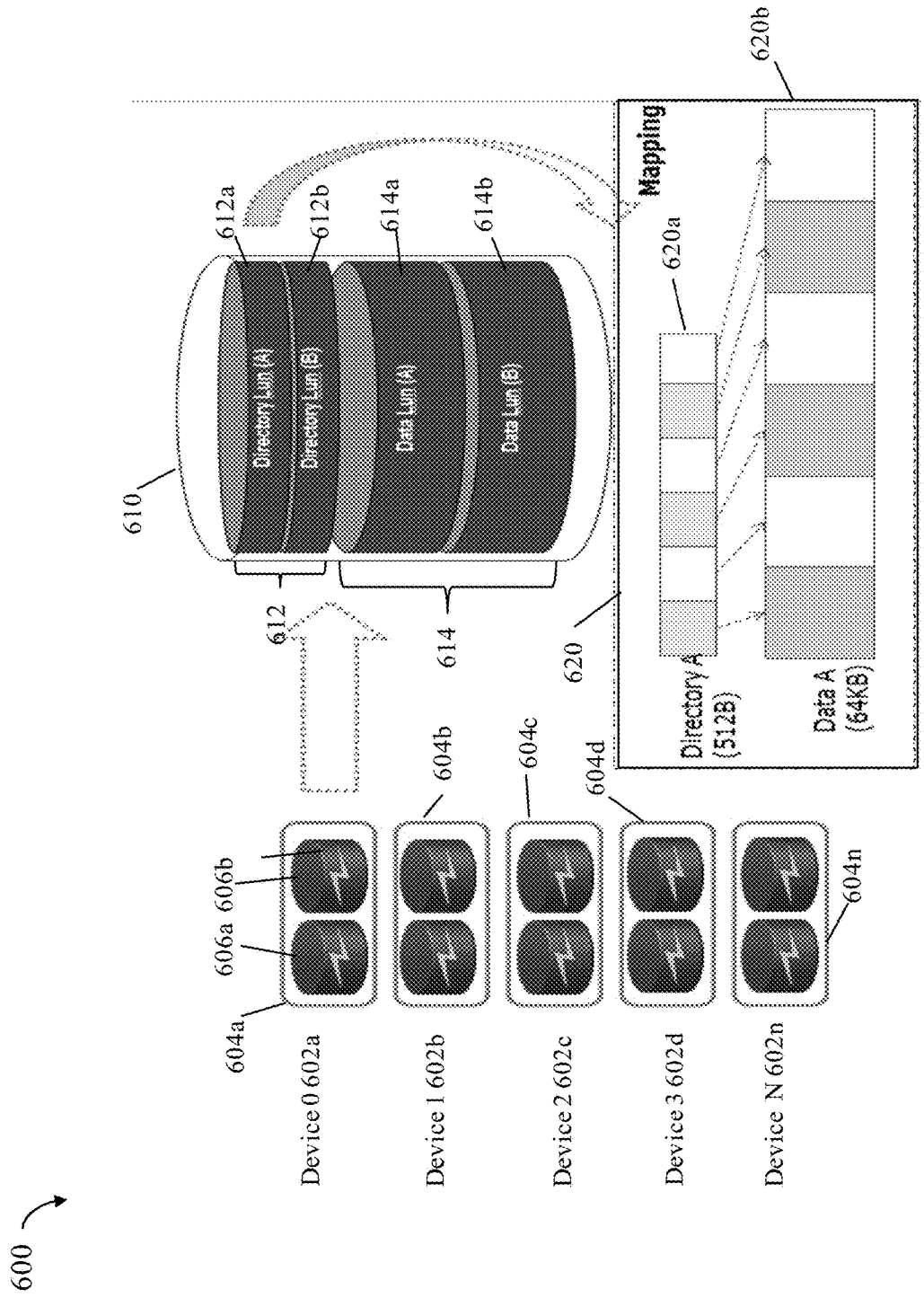

Referring to FIG. 6, shown is an example illustrating in more detail the RAID-1 flash disk cache arrangement for storing data as shown in FIG. 5. Elements 602*a-n* denote the N cache devices each having storage configured from a RAID-1 group such as described in connection with 504*a-n* of FIG. 5. Elements 604*a-n* may denote the different RAID-1 groups or PD configurations such as described in connection with elements 506*a*-506*n* of FIG. 5. Consistent with discussion above, each of the N cache devices 602*a-n* is a logical device having its data and metadata stored on a pair of PDs. For example, cache device 0 602*a* has its data and metadata stored on a pair of PDs 606*a*, 606*b* of a RAID-1 group 604*a*. Element 610 illustrates in more detail how data and metadata may be stored on each PD (e.g., each of 606*a*, 606*b*) of a RAID-1 configuration (e.g., 604*a*) providing physical storage for a configured cache device, such as 602a. Each of the PDs providing physical storage for a cache device 602a-602n may be a flash-based physical storage device providing physical cache storage for the flash disk cache. For example, each of the PDs 606a, 606b may be a flash-based physical storage device providing physical cache storage for the flash disk cache for cache device 0 602a.

As illustrated by 610, each of the PDs 606a, 606b, may include metadata 612 and cached data 612. Elements 612 and 614 illustrate respectively metadata and data that may be stored on each of the PDs 606a, 606b for cached data of user LUNs A and B where each such LUN has its own metadata portion in 612 and each such LUN also has its own cached data portion in 612. Element 612a is the metadata portion for LUN A and element 612b is the metadata portion for LUN B. Element 614a is the cached data of LUN A stored in the flash disk cache and element 614b is the cached data of LUN A stored in the flash disk cache. It should be noted that the metadata portions 612a, 612b may include directory or mapping information indicating the physical location in the flash disk cache where each cached data page is stored.

Element 620 illustrates in more detail use of the mapping or directory information of the metadata portion 612a and cached data portion 614a for LUN A. In particular, element 620 illustrates the directory or mapping information 620a for LUN A which includes a list of physical locations at which all cached data 620b for LUN A is stored One drawback of using RAID-1 as the configuration for all cached data of the flash disk cache is the amount of physical storage consumed for storing each data item (e.g., consumes an amount of storage that is twice the amount or size of the data item and additionally any metadata needed).

In connection with an embodiment in accordance with techniques herein, rather than store two copies of all cached data with the RAID-1 configuration in the flash disk cache, an embodiment in accordance with techniques herein may store only a single copy of clean cached data and store two copies of dirty data on two different PDs of the flash disk cache. Thus, the flash disk cache includes two copies of each dirty cached page which contains the most recent copy of the user data where each copy is stored on a different PD. In this manner, protection is provided against data loss of the dirty cached data whereby, in the event of a single PD failure including one copy of the cached dirty data, there is still a second copy of the cached dirty data on a second PD of the flash disk cache. However, such protection is not needed for clean cached data since the physical non-volatile storage of the disk drives or other back-end storage of the PD layer 314 also includes the most recent copy of the cached data.

Figure 7:
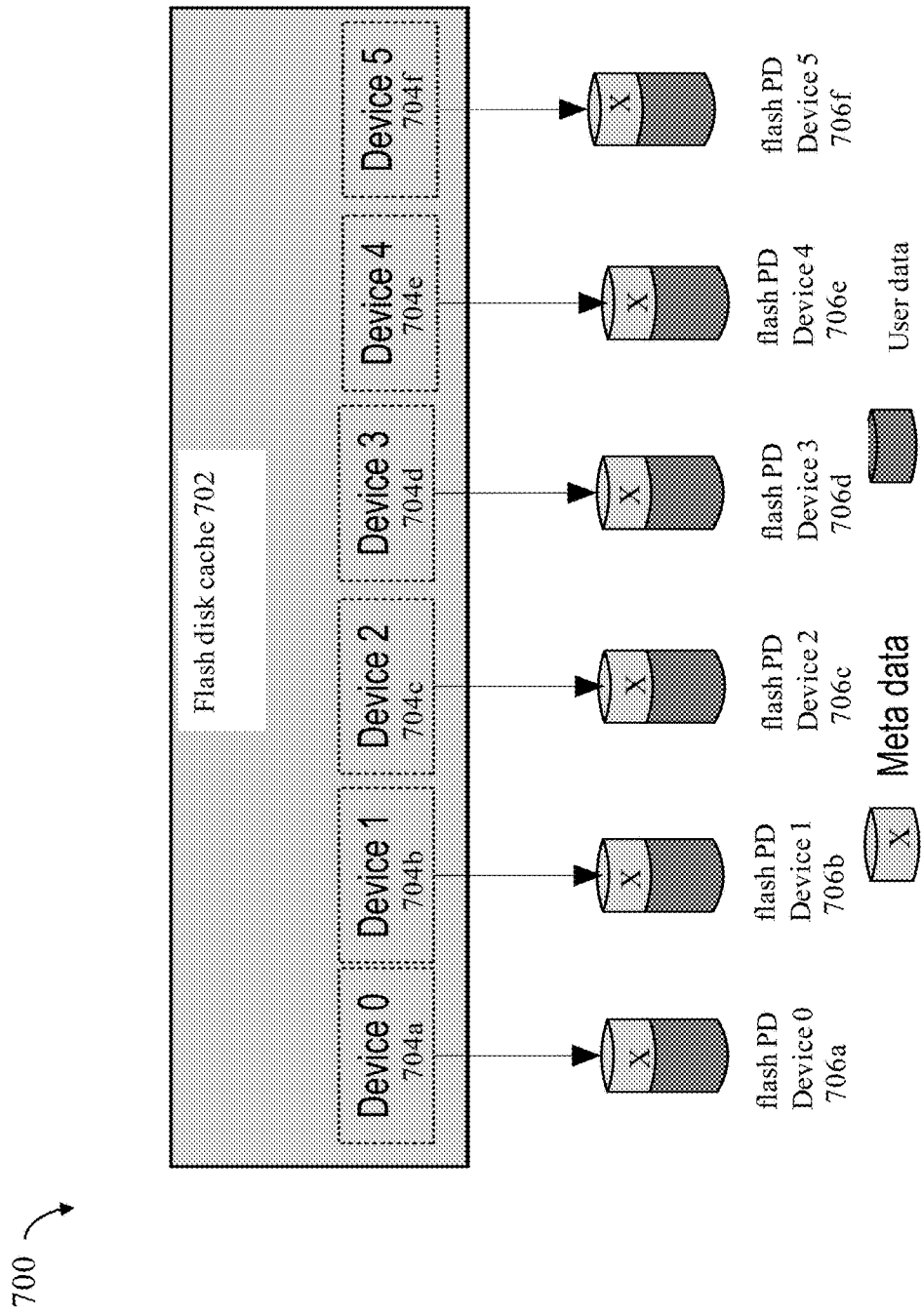
FIGS. 7, 8, 10, 13, and 15 are examples illustrating use of the flash disk cache in an embodiment in accordance with techniques herein.

Referring to FIG. 7, shown is an example 700 illustrating a flash disk cache layout in an embodiment in accordance with techniques herein. Elements 704a-f may each be a different cache device or logical cache device such as described above in connection with elements 504a-n of FIGS. 5 and 602a-n of FIG. 6. Elements 706a-706f may each be a different PD which is a flash-based storage device in connection with the flash disk cache. Elements 706a-f are similar to PDs 606a, 606b as described in connection with PDs of the RAID-1 configuration 604a of FIG. 6 and also PDs 510a, 501b as in 506a of FIG. 5 (e.g., each of 706a-f may include a single set of metadata and user data but 706a-f are not included in a RAID-1 configuration).

In the example 700, the flash disk cache 702 may be configured whereby each of the cache devices or logical cache devices 704a-f has its storage provisioned from a single PD that is a flash-based physical storage device providing physical cache storage for the flash disk cache. In this manner, flash PD devices 706a-f provide physical storage, respectively, for cache devices or logical cache devices 704a-f. Each of the flash PD devices 706a-f may include a single set of user data that is cached along with associated metadata for the cached user data of the particular flash PD device. With such a layout or configuration as in FIG. 7, each clean page of cached data may be mapped to only a single cache device and thus only a single flash PD. Additionally, each dirty page of cached data may be mapped to two different cache devices and thus two different physical flash PD devices. If one of the flash PD devices storing the dirty cached data fails, there is still another second copy of the dirty cached data on a second flash PD device of the flash disk cache.

Such an arrangement as described in FIG. 7 in accordance with techniques herein provides for more efficient use of the flash disk cache storage to possibly cache more data (in comparison to the arrangement of FIG. 5) while also providing needed data protection for dirty cached data.

Figure 8:
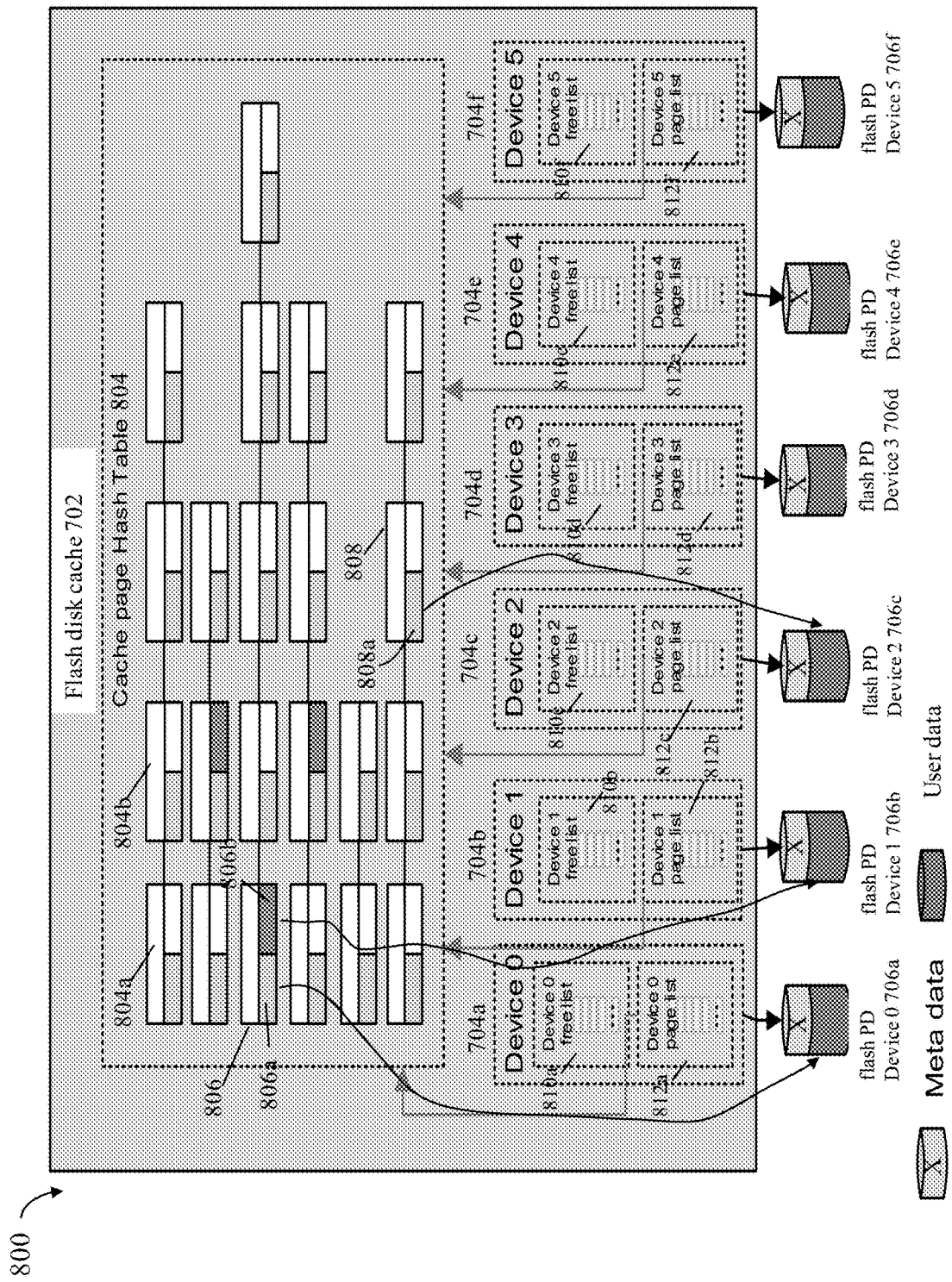

Referring to FIG. 8, shown is an example of cache page management and associated data structures that may be used in an embodiment in accordance with techniques herein. Elements 702, 704a-f and 706a-706f are as described above in connection with FIG. 7. Additionally, the example 800 illustrates the flash disk cache 702 having cached data pages stored in a cache page hash table structure 804. Each of the cache devices 706a-706f may have both user data and metadata stored thereon such as for a single PD as generally described above. Additionally, metadata cache devices 706a-f may include free lists 810a and page lists 812a. It should be noted that in at least one embodiment, the cache page hash table 804 may be a data structure stored in main memory, or more generally, a form of volatile memory such as DRAM used by the data storage system.

Each of the larger rectangles, such as 804a, 804b, 806 and 808, in the cache page hash table 804 may denote an entry in the hash table for each page of cached data. Hash tables, structures used for implementing hash tables, and management thereof for storing data are known in the art. In at least one embodiment, the hash list may be implemented using a linked list structure of entries such as denoted by each of the larger rectangles (e.g., 804a, 804b, 806 and 808). With a hash table, a hashing algorithm or technique may determine a hash value based on the data being stored. The hash value may map to a particular entry in the hash table. In this manner, given a particular page of data, its hash value and corresponding entry in the hash table may be determined. The entry in the hash table may include various items of information regarding the cached data page such as the one or more physical locations in the cache as to where the cached data page is stored, the logical address, such as LUN, LBA, of the cached data page, and the like.

Figure 9:
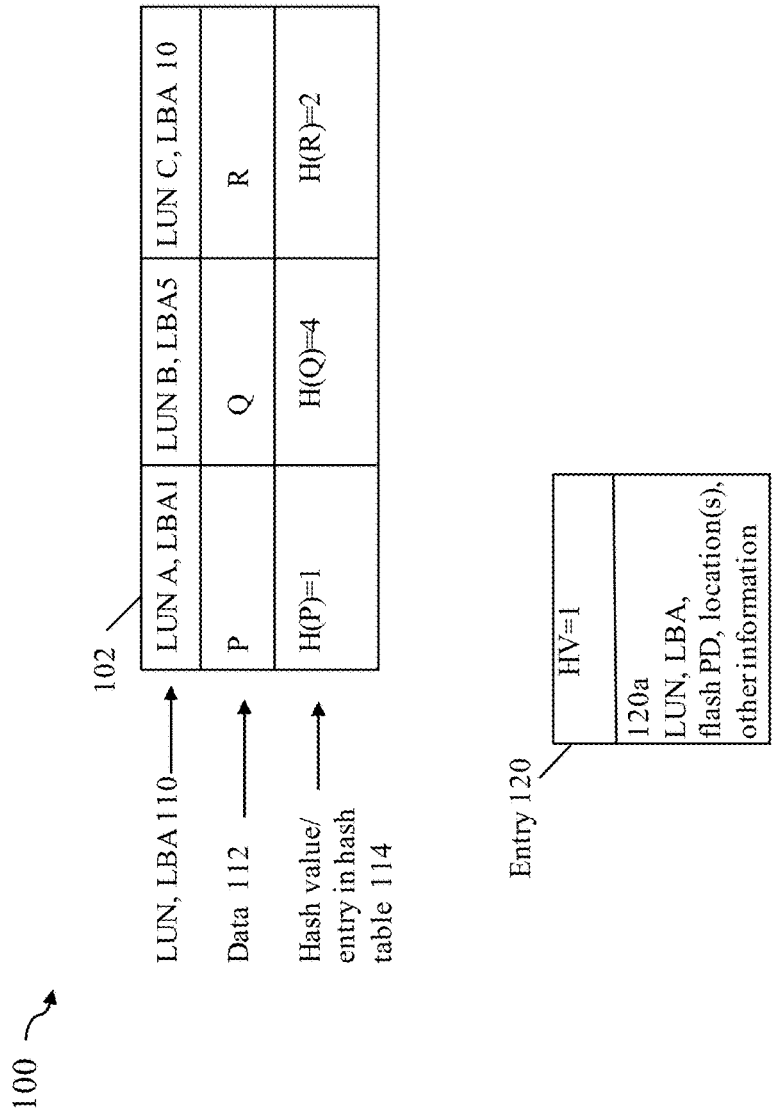
FIG. 9 is an example illustrating hashing and hash table entries that may be used in an embodiment in accordance with techniques herein.

For example, referring now to FIG. 9, shown is an example 100 including a table 102 with 3 different data pages to be stored in cache. Each column of table 102 includes information for each page to be stored in the flash disk cache. Row 110 denotes the logical addresses of the user data being cached. Each such logical address may be a LUN and LBA (identifying a location on the LUN). Row 112 may include the various pages of cached data as represented by the letters P, Q and R. Each of the letters P, Q and R may denote a different page of data to be stored in the flash disk cache. In connection with the techniques described herein, a token, signature, or reference uniquely representing each of the pages of data to be cached may be obtained. In one embodiment, the token or reference is a hash value obtained using a hashing function, such as a cryptographic hashing function or, more generally, any suitable hashing function. The size of the hash value used in connection with the techniques described herein may with embodiment.

A hash value for each of the 3 pages (P, Q and R) of data in 112 may be determined. The hash values for each of the cached pages are included in row 114. For example, H(P)=1 may denote the hash value for data P, H(Q)=4 may denote the hash value for data Q, and H(R)=2 may denote the hash value for data R. The hash value determined for each page of cached data may identify an entry in the hash table including information for the cached data.

Each entry of the hash table may include information regarding the cached data page which hashed to the particular entry. For example, element 120 illustrates information that may be stored in each entry of the hash table 804. Entry 120 may have an associated hash value (HV) such as 1 whereby a particular page of data generating an HV of 1 may be mapped to this particular hash table entry. Additionally, each entry 120 may include information 120a such as identifying the logical address (e.g., LUN, LBA) of the cached data page, the one or more physical locations in the flash disk cached at which the cached data page is stored, and other information. Each of the physical location(s) at which the cached data page is stored may identify a particular flash PD and location on that PD where the cached data page is stored. In connection with a clean cached data page having entry 120, an embodiment in accordance with techniques herein includes only a single physical cache location where the cached data is stored. In connection with a dirty cached data page having entry 120, an embodiment in accordance with techniques herein includes two physical cache locations where the cached data is stored.

Returning again to FIG. 8, element 806 may represent a hash table entry for a cached data page of dirty data. In this case, element 806a is a pointer to a first physical cache location on flash PD 706b a where a first copy of the cached dirty data is stored in the flash disk cache. Additionally, element 806b is a pointer to a second physical cache location on flash PD 706b a where a second copy of the cached dirty data is stored in the flash disk cache. Element 808 may represent a hash table entry for a cached data page of clean data. In this case, element 808a is a pointer to a single physical cache location on flash PD 706b a where the only cached copy of the cached clean data is stored in the flash disk cache. Thus, as denoted by 808, there is no second copy of the clean cached data stored in cache. In contrast, as denoted by 806, there are two physical copies of the dirty cached data stored in cache where each copy is stored on a different flash PD of the flash disk cache.

For each cache device 704a-f, different lists may be maintained for use in cache management. Elements 810a-f denote free lists for, respectively, cache devices 704a-f. Elements 812a-f denote page lists or cached page lists for, respectively, cache devices 704a-f. Each of the free lists 810a-810f may identify free or unused physical locations, respectively, on the different flash PD devices 706a-f Thus, processing to obtain a free or unused cache location when caching a new data page may traverse one or more free lists 810a-f. The cached page lists or page lists 812a-f identify the cached data pages stored at different physical locations, respectively, on flash PD devices 706a-f. In at least one embodiment, each of the cached page lists 812a-f may include a set of LUN LRU lists as described in connection with FIG. 4 for those LUNs having cached data stored on the particular flash PD device associated with the particular cached page list. For example, element 812a may include a set of LUN LRU lists as described in connection with FIG. 4 for those LUNs having cached data stored on flash PD device 0 706a. Similarly, each of elements 812b-f may include a set of LUN LRU lists as described in connection with FIG. 4 for those LUNs having cached data stored, respectively, on flash PD devices 706b-f Additionally, as described herein, in at least one embodiment, a dirty page list may be maintained for each LUN. Thus, in such an embodiment, element 812a may include a set of dirty page lists (e.g., one dirty page list for each LUN) as described in connection with FIG. 4 for those LUNs having cached data stored on flash PD device 0 706a. Similarly, each of elements 812b-f may include a set of dirty page lists (e.g., one dirty page for each LUN) as described in connection with FIG. 4 for those LUNs having cached data stored, respectively, on flash PD devices 706b-f.

Figure 10:
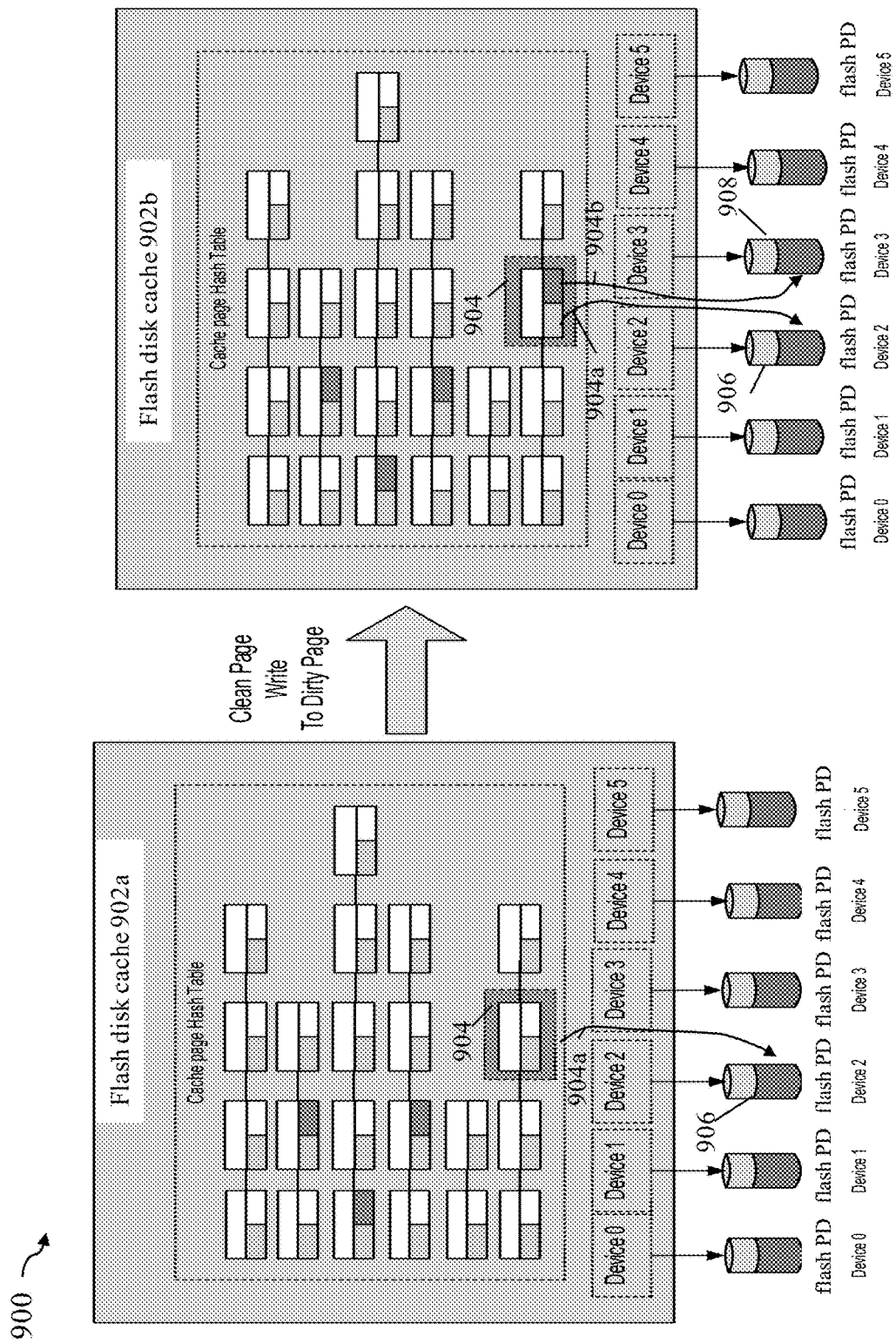

Referring to FIG. 10, shown is an example 900 in connection with processing a write I/O in an embodiment in accordance with techniques herein. A write operation may be received by the flash disk cache layer for processing. A determination may be made as to whether data for the particular LUN, LBA, or target location to which the write is directed, is already stored in the flash disk cache meaning there is a cache hit with respect to the flash disk cache. If there is a flash disk cache hit with respect to a write operation directed to a target location, it may be that the currently cache data for the target location is a clean page of cached write data whereby only a single copy of the write data is currently stored in the flash disk cache. To further illustrate, element 902a may denote the flash disk cache at a first point in time prior to receiving the write operation. In connection with a flash disk cache hit for a write operation directed to a target location, assume that entry 904 denotes the cached data for the target location and entry 904a includes a pointer 904a to the physical location on flash PD device 2 906 where the clean cached data is currently stored. To process the write operation, the flash disk cache layer locates entry 904 to determine the cache hit, and determines that the cache hit is to a clean cached page with only a single physical cache location including the cached data prior to performing the write operation. Processing is then performed to search for a second free page on another flash PD of the flash cache. In this example, processing may locate a free cache page on flash PD device 3 908 to use as the second physical cache location for storing the write data. Accordingly, processing may now write the write data of the write operation to both the first cache page on flash PD 906 and the second cache page on flash PD 908 and then report this I/O as successfully completed up through the different layers of drivers in connection with the different caching and other layers (e.g., such as layers described in FIG. 3). Element 902b may denote the state of the flash disk cache after completing the processing of the write operation whereby two copies of the write data are written out to 2 different cache pages stored on 2 different flash PD devices. Furthermore, processing may include denoting that the cached data for the target location is now dirty. In 902b, note that the entry 904 includes two pointers 904a and 904b to two cache pages of two different flash PD devices 906, 908. In connection with processing the write operation, two writes may be performed to updates the two cache pages on 906, 908 identified, respectively, by 904a, 904b.

Figure 11:
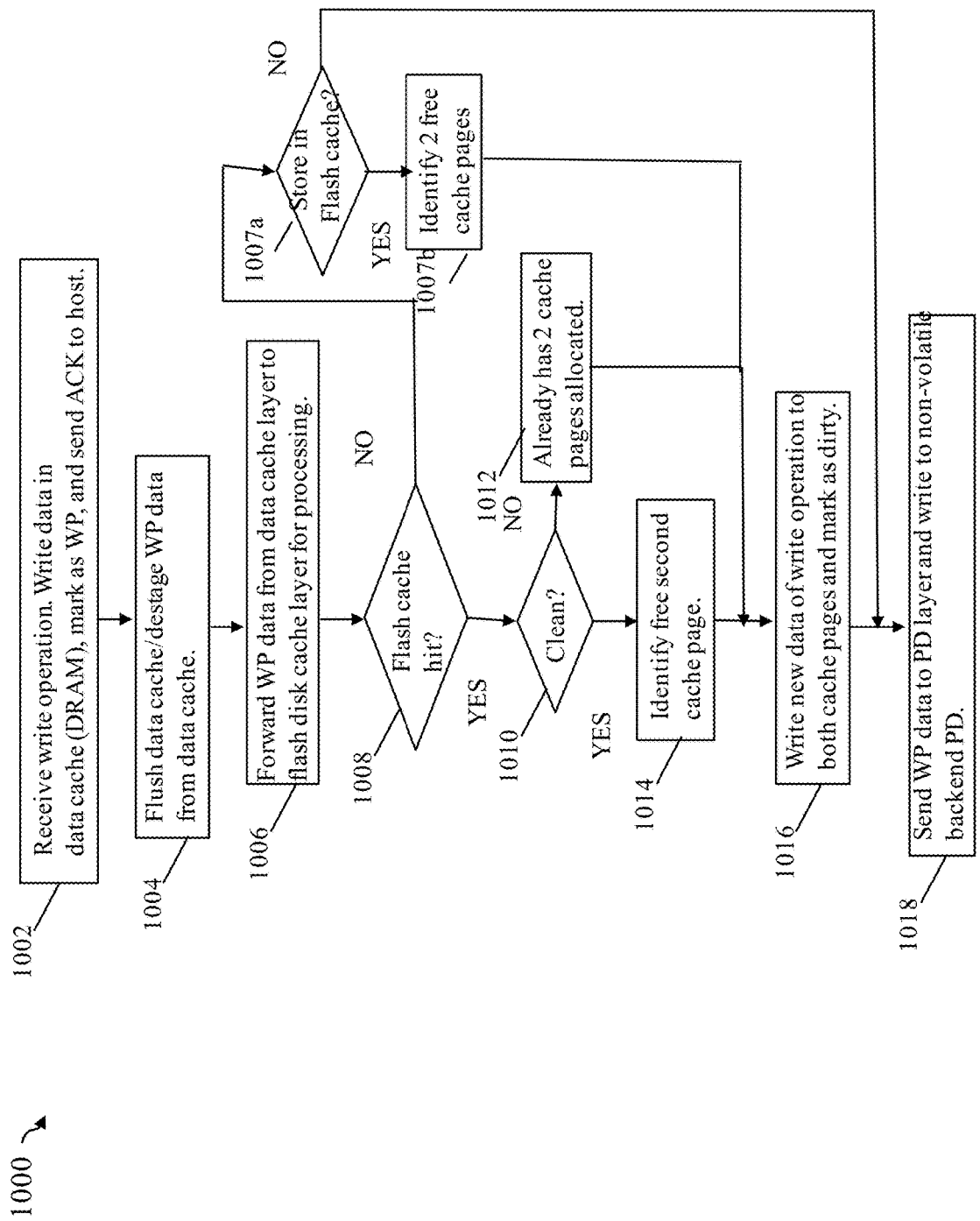
FIGS. 11, 12, 16 and 17 are flowcharts of processing steps that may be performed in an embodiment in accordance with techniques herein.

Referring to FIG. 11, shown is a flowchart of processing steps that may be performed in an embodiment in connection with techniques herein. The flowchart 1000 summarizes processing described above in connection with FIG. 10. At step 1002, a write operation is received at the data storage system from a host or other client of the data storage system. The write operation writes new data to a target location, such as LUN, and LBA on the LUN. At step 1002, the write data is stored in the data cache, such as the DRAM cache, marked as WP and then an acknowledgement is sent to the host. Some time later, processing continues with step 1004 where processing is performed to flush data from the data cache whereby WP data is destaged form the data cache. At step 1006, the WP data is sent from the data cache layer to the flash disk cache layer for processing. At step 1008, a determination is made as to whether there is a flash disk cache hit for the target location whereby the target location currently has data stored in the flash disk cache. If step 1008 evaluates to no, control proceeds to step 1007*a* where a determination may be made as to whether to promote or store the data for the target location in cache. As described herein, such a promotion may be made based on the frequency of access (e.g., number of I/Os) of data at the target location. If step 1007*a* evaluates to no, control proceeds to step 1018. If step 1007*a* evaluates to yes, control proceeds to step 1007*b* to identify 2 free cache pages on 2 different flash PD devices of the flash disk cache for storing the new write data. From step 1007, control proceeds to step 1016.

If step 1008 evaluates to yes, a determination is made at step 1010 as to whether the cached data for the target location is clean. If step 1010 evaluates to no, meaning that the flash disk cache already includes dirty cached data for the target location and thus already has 2 cache pages allocated for storing the dirty data, control proceeds to step 1016. If step 1010 evaluates to yes, meaning that there is only a single cache page allocated on a first flash PD device for storing the data of the target location, control proceeds to step 1014 to identify a free second cache page on a second flash PD device different from the first flash PD device. At step 1016, processing is performed to write out the new data of the write operation to both cache pages and mark the cached data of both pages as including dirty cached data. At step 1018, the WP data is sent to the PD layer to write to non-volatile storage of the backend PD layer. It should be noted that once the data has been written out successfully to the backend PD layer non-volatile storage, processing may be performed to now indicate to the flash disk cache layer and also the data cache or DRAM cache layer that the WP data of the target location has been destaged. Accordingly, any cache pages of the flash disk cache including the WP data for the target location may be marked as clean and one of the two cached pages freed or made available for storing other data. Additionally, the copy of the data for the target location stored in the data or DRAM cache may be marked as no longer WP (e.g., clear WP status of cache location including target location data).

In connection with processing data of a write I/O operation, processing may consider the size of the write I/O size (e.g., size or amount of data to be written to the flash disk cache) with respect to the size of a single cache page. If the write I/O size is equal to or less than the size of the single cache page, processing may be performed as described above where the write data is written out to 2 cache pages, wait until both writes have been successfully written to the flash disk cache, and then return an acknowledgement to the data cache layer or, more generally, another layer which invoked the flash disk cache layer to perform processing with respect to the write I/O data. However, if the write I/O size is larger than the cache page size, processing may be performed to partition or divide this larger write into multiple writes where each of the multiple writes writes data that is equal to or less than a single cache page in size. In such a case where the write I/O size is larger than the cache page size, each of the individual multiple writes may be processed separately as a single write such as described above based on the particular logical address (e.g., portion of the target location) associated with each of the multiple writes.

For example, consider a write I/O operation having an I/O size of 2.0 cache pages. In this case, the single large write may be partitioned into 2 writes—a first write of 1 cache page and a second write of the second cache page. Assume further that the target location associated with the first write is a cache hit with respect to the flash disk cache. In this case, the first write may be processed such as in accordance with the flow of FIG. 11 and as described in connection with FIG. 6 to write 2 copies of the first write data to the flash disk cache. Assume also that the target location associated with second write is a cache miss with respect to the flash disk cache. In this case, the second write may be processed such as in accordance with the flow of FIG. 11 where no write data is cached to the flash disk cache and the write data of the second write is forwarded to the PD layer for storing on backend non-volatile storage.

Figure 12:
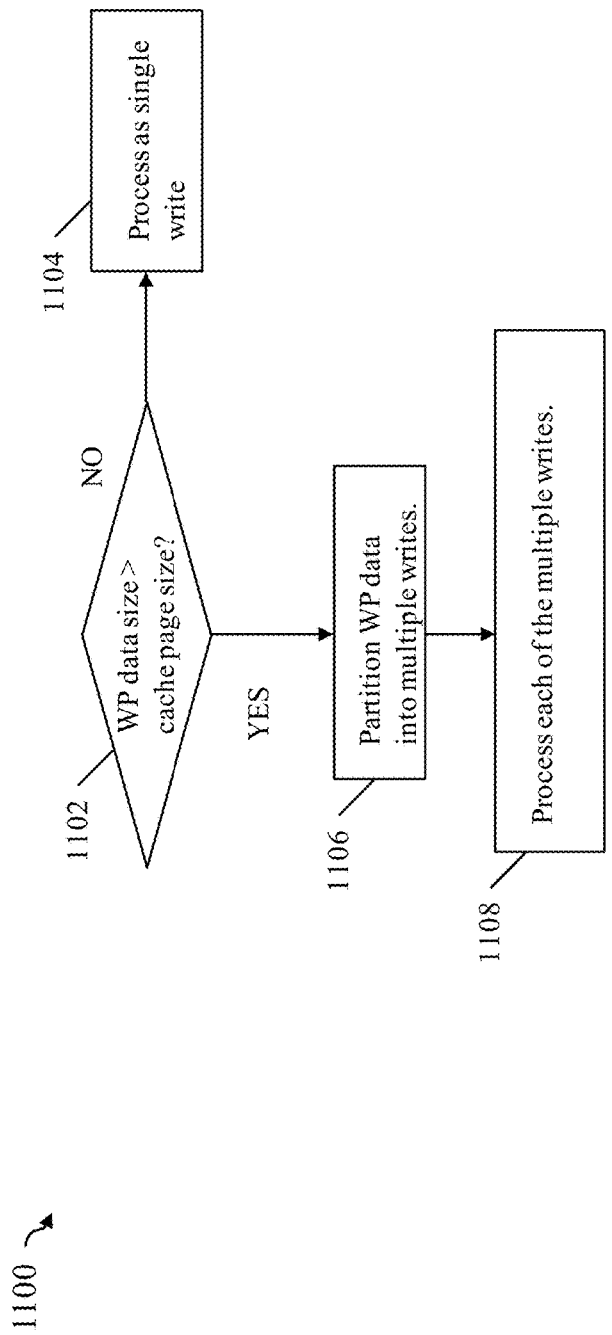

Referring now to FIG. 12, shown is a second flowchart of processing steps that may be performed in an embodiment in accordance with techniques herein. The flowchart 1100 summarizes processing described above for processing write data or WP data as may be received by the flash disk cache layer. At step 1102, a determination is made as to whether the WP data size is larger than the cache page size. If not, control proceeds to step 1104 to process the WP data as a single write such as in accordance with FIG. 11 processing. If step 1102 evaluates to yes, control proceeds to step 1106 to partition the single write or WP data portion into multiple data portions whereby the multiple data portions are written with multiple writes (e.g., one data portion written per write operation). Each of the multiple write operations writes a data portion that is no larger than a single cache page size. At step 1108, each of the multiple writes may be processed in accordance with FIG. 11 processing.

As noted above, in connection with processing data such as write data, to be stored in the flash disk cache, the flash disk cache layer performs processing to locate the needed one or more free pages. For example, when a cache hit occurs with respect to the flash disk cache for a write I/O that writes to a target location and the flash disk cache (prior to the write) includes a clean first cache page of data for the target location, processing is performed to locate a free second page of the cache so that the new write data may be written to both the first cache page and the newly allocated second cache page. In at least one embodiment, the particular flash PD selected may be performed as will now be described with reference to FIG. 13.

Figure 13:
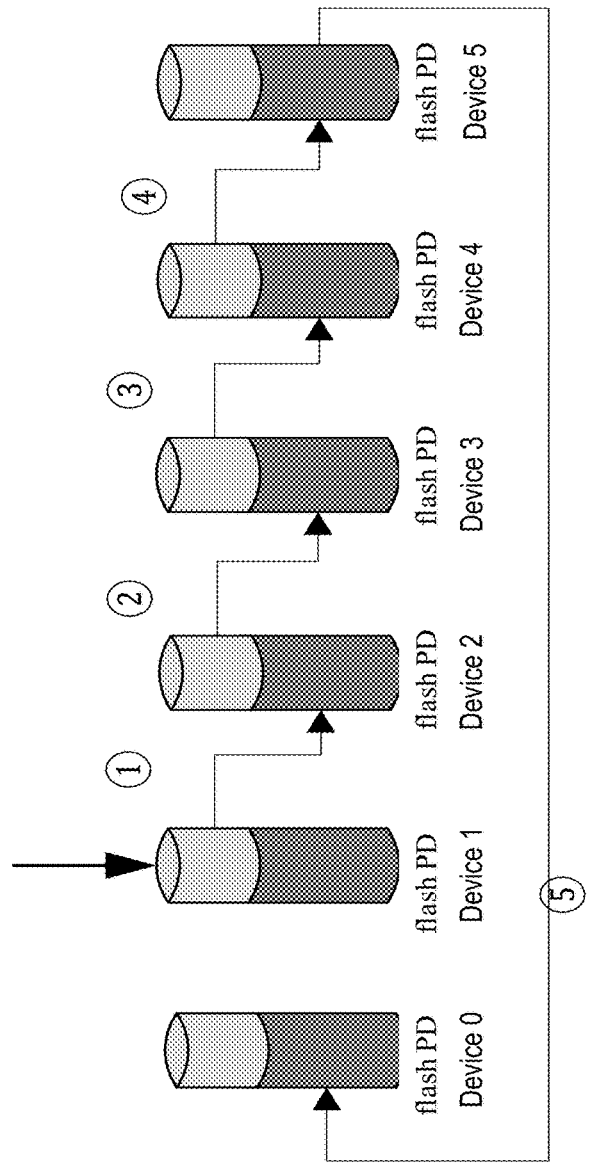

In the example 1200, processing is illustrated for searching for a free cache page in the flash disk cache. In at least one embodiment, searching may be performed in a round robin manner by sequentially traversing the flash PDs of the flash disk cache from left to right in accordance with an ordering of device numbers associated with the flash PDs forming the flash disk cache. For example, the flash disk cache may include 5 flash PD devices as illustrated in FIG. 13 each having an associated device number. The traversal for a free cache page may traverse the devices in an order from lowest to highest device number and then, in a cyclical manner, continue again beginning with the lowest device number. A current pointer or marker may track which flash PD device is next in the cycle. For example, at a first point in time, processing may commence with flash PD device 0 to look for a free cache page. However, there may be no free pages on flash PD device 0 so processing continues to look for a free cache page on flash PD device 1 where a free cache page is located and used for caching desired data. At a second point in time, another free cache page may be needed so processing commences with flash PD device 2 to look for a free cache page. However, there may be no free pages on flash PD device 2 so processing continues to look for a free cache page on flash PD device 3 where no free cache page is located. Processing continues to look for a free cache page on flash PD device 4 where no free cache page is located. Processing then continues to look for a free cache page on flash PD device 5 where again no free cache page is located. Processing continues to look for a free cache page on flash PD device 0 where a free cache page is finally located and used for storing desired data. At a third point in time when another free cache page is needed, processing may commence to search for a free cache page beginning with flash PD device 1. The foregoing may be performed to facilitate evenly spreading device wear that occurs with writes to flash-based storage.

Additionally, it should be noted that processing as described herein in connection with FIG. 13 may also require that the free cache page not be located on a particular flash PD device. For example, as discussed above, the two copies of dirty cache data stored in the flash disk cache need to be stored on two different physical devices or two different ones of the flash PD devices 0-5 comprising the flash disk cache. In this case, the above-mentioned traversal of devices may be performed omitting any single flash PD device already caching a first copy of a dirty cache page.

It should be noted that cache management of the flash disk cache may try to keep a certain threshold number of free pages, so that normally a free pages may be located when needed. For example, at defined time intervals and/or responsive to less than a threshold number of cache pages being free, processing may be performed by cache management to flush dirty data from the flash disk cache as described elsewhere in more detail. However, there are times when there may be no free page located in the flash disk cache when needed. In this case, an embodiment may evict one or more pages of cached data from the flash disk cache. For example, in at least one embodiment in accordance with techniques herein, the oldest clean page may be selected from one of the flash PD devices. As described herein, LUN LRU lists may be maintained and stored on each flash PD device for LUNs having cached data stored on the flash PD device. The age of each cached page may be determined based on the last time the cache page was accessed in connection with an I/O operation. Age of a cached page of data may be represented as the difference between the current time and the last time the cache page was accessed. Thus, the more recently accessed a cache page, the smaller the age. Each LUN LRU list may be sorted, for example, based on increasing order of age or time since last accessed whereby the least recently used cached data page is the oldest and the most recently used cache page is the youngest. In such a case, the oldest clean page may be determined by traversing the LRU list for the LUN and selecting the cache page which is the oldest (LRU) and also is a clean cache page (e.g., not on the dirty page list as discussed elsewhere herein).

Figure 14:
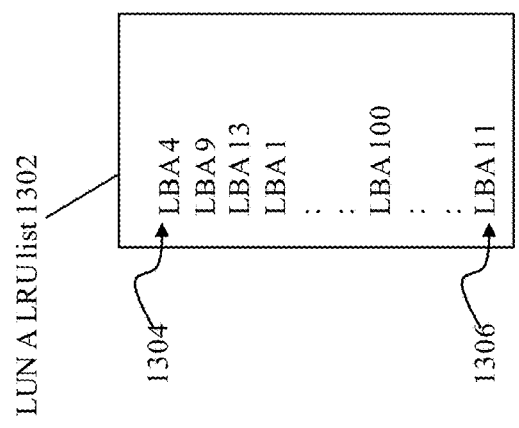

For example, with reference to the example 1300 of FIG. 14, shown is a single LUN LRU list 1302 for LUN A. For a single flash PD such as flash PD device 0 of FIG. 13, the single LUN LRU list may be similarly maintained on stored for each LUN having cache data stored on flash PD device 0. Furthermore, such multiple LUN LRU lists may be similarly stored and maintained for each for the 5 flash PD devices. Assume, for example the LUN A LRU list 1302 is stored and maintained on flash PD device 0 where each LBA in the list 1302 has its data cached on flash PD device 0. The list 1302 may be ordered based on time since data associated with each such LBA of LUN A was last or most recently accessed. For example, element 1304 LBA 4 may represent the most recently accessed cache data page and element 1306 LBA 11 may denoted the least recently accessed cached data page. Also, assume that the LRU cached page for 1306 is clean. In such a case, an embodiment in accordance with techniques herein may select for eviction from flash PD device 0 one of the oldest or least recently used clean pages on a LUN LRU list such as LBA 11. If there are multiple LUN LRU lists for the flash PD device 0, an embodiment may select the least recently used/oldest clean cache page from any of the LUN LRU lists or may select the oldest clean cache page of all the LUN LRU lists.

Furthermore with reference back to FIG. 13, an embodiment in accordance with techniques herein may be a policy defined to traverse or select a particular one of the flash PD devices from which to evict a cache page. For example, in at least one embodiment, if there are no free cache pages and a free cache page is needed, the LRU cache page may be selected from the highest number flash PD device. As a variation, an embodiment may select the LRU cache page from the next flash PD device in the traversal sequence from which a cache page should be allocated based on the cyclical traversal as described above in connection with FIG. 13.

Referring to FIG. 14, shown is an example illustrating processing performed when cleaning a dirty cache page such as when flushing dirty pages from the flash disk cache in an embodiment in accordance with techniques herein. When cleaning a dirty cache page whereby the dirty cached data is flushed from the flash disk cache to the PD layer or backend non-volatile storage, processing is performed to first read the dirty cache data from one of the two copies of the dirty page as stored in the flash disk cache. In a second step, the dirty cached data read is then passed to the PD layer to write out the dirty cache page of data to the backend non-volatile storage. After the PD layer has successfully flushed or written the data to the backend non-volatile storage, in a third step, one of the links to one of the two copies of the cached data stored on a flash PD device is broken and returned to the flash PD device's free page list. Additionally, in the third step, the cache data is then indicated as clean (e.g., may be removed from the dirty page list for the particular LUN).

Element 1402*a* shows the state of the flash disk cache prior to flushing dirty cache page having associated hash table entry 1404. Assume in this example the dirty cache page is caching data having an associated logical address of LUN A, LBA N. Consistent with discussion elsewhere herein, element 1404*a* is a first pointer to a first cache page on flash PD device 2 and element 1404*b* is a second pointer to a second cache page on flash PD device 3, where each of the foregoing first and second cache pages includes a copy of the dirty cache page of data having entry 1404.

Element 1402*b* shows the state of the flash disk cache after performing the 3 steps outlined above to flush the dirty cache page 1404. As illustrated in 1402*b*, only a single copy of the cached data is stored 1404*a* on flash PD device 2. In connection with the above-noted third step, the dirty page lists for LUN A as stored on flash PD devices 2 and 3 may be updated to remove the cached page for LUN A, LBA N from the dirty page lists. Additionally, the cache page for the second copy stored on flash PD device 3 may be added to the free list of cache pages for flash PD device 3.

In at least one embodiment in accordance with techniques herein, a background process may be executed to flush dirty cache pages from the flash disk cache. For example, the background process may perform such processing responsive to any one or more defined trigger conditions. For example, one of the trigger conditions triggering flushing of the flash disk cache by the background process may be when the flash disk cache does not having at least a threshold number of free cache pages. An embodiment may perform such flushing of the dirty cache pages from the flash disk cache to backend non-volatile storage (e.g., PD layer 314) in any suitable manner whereby the flash PD devices of the flash disk cache may be flushed in any suitable order.

Figure 15:
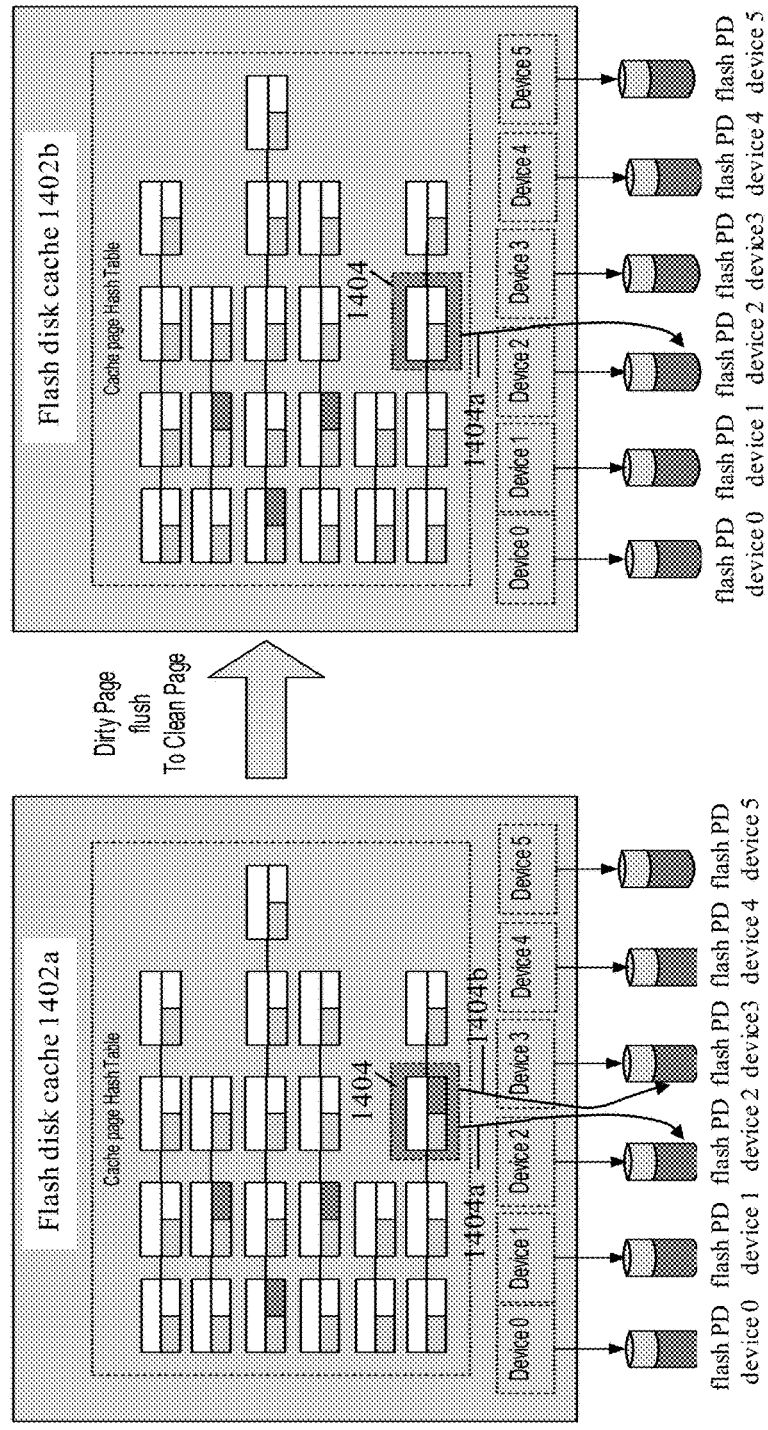
Figure 16:
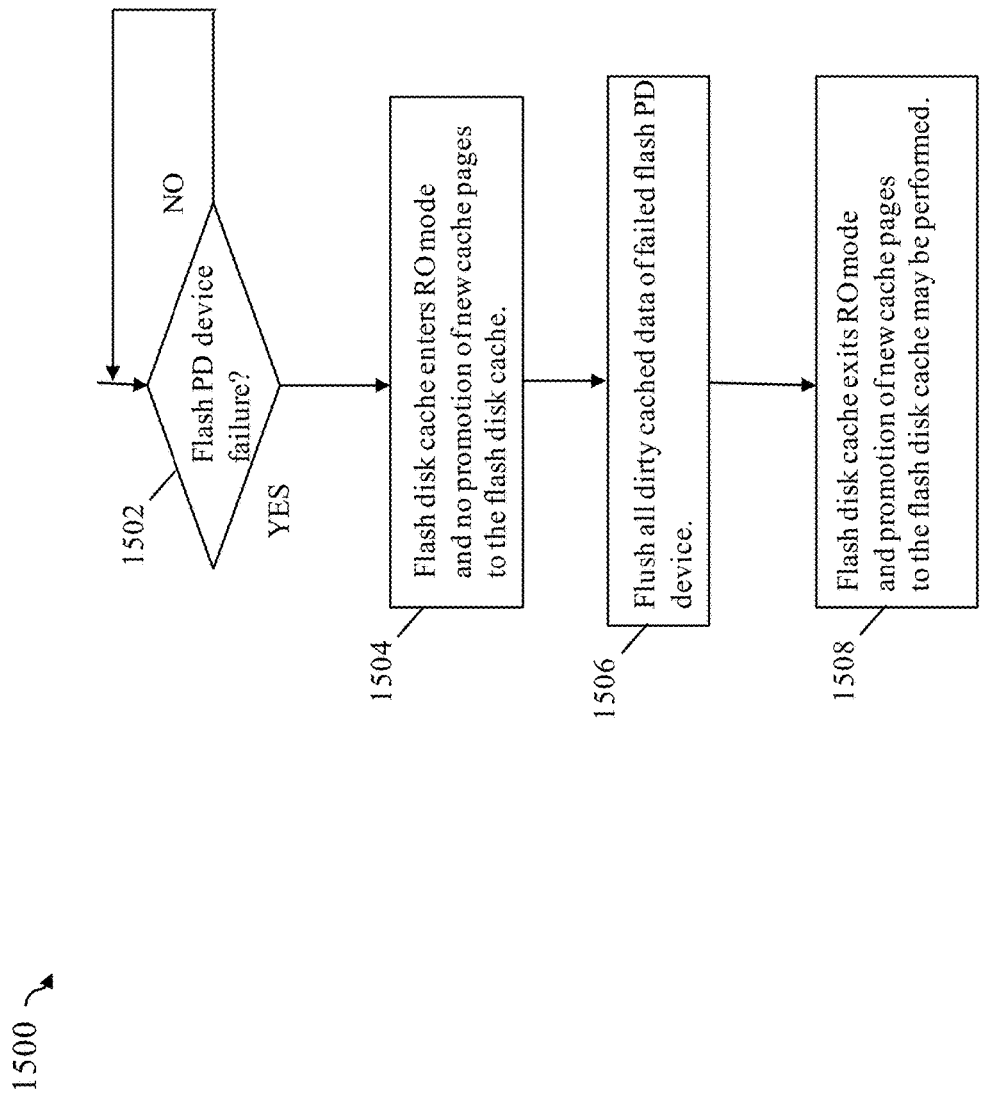

An embodiment in accordance with techniques herein may perform processing such as illustrated in flowchart 1500 of FIG. 16 responsive to failure of one or more of the flash PD devices of the flash disk cache. At step 1502, a determination may be made as to whether there has been a flash PD device failure for any of the flash PD devices comprising the flash disk cache. Control remains at step 1502 until step 1502 evaluates to yes. If step 1502 evaluates to yes, control proceeds to step 1504 where the flash disk cache enters a read only (RO) mode where no further data may be written to the flash disk cache. Consistent with RO mode, no new cache pages are promoted to the flash disk cache. At step 1506, processing is performed to flush all dirty cached data having one of its two copies stored on the failed flash PD device (e.g., device that failed causing step 1502 to evaluate to yes). Step 1506 may include traversing the hash table entries of the flash disk cache and determining whether any of the links for any entry are mapped to physical storage locations or cache pages located on the failed flash PD device. The flushing process is as described above (e.g., such as in connection with FIG. 15) whereby the dirty cache page of data is written out to the PD layer of backend non-volatile storage (e.g. PD layer 314 of FIG. 3).

Figure 17:
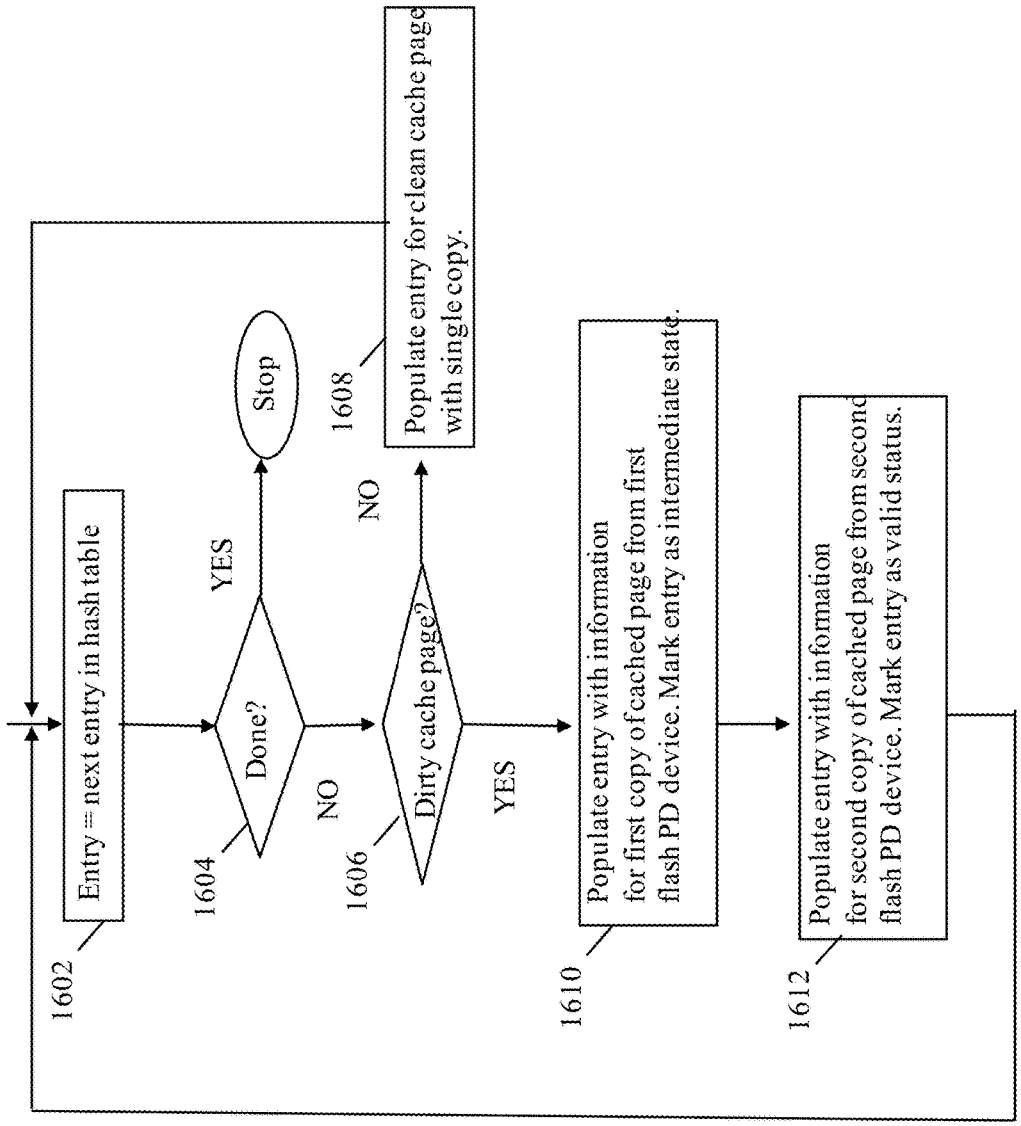

Referring to FIG. 17, shown is an example flowchart 1600 illustrating processing that may be performed in an embodiment in accordance with techniques herein when reloading cache page metadata such as in connection with booting/rebooting the flash disk cache such as in connection with rebooting the data storage system. In such a case, the cached data and associated metadata used to populate the cache page hash table may be stored in the flash PD devices of the flash disk cache. On rebooting the flash disk cache, metadata used to populate the cache page hash table and other management structures may be read from the flash PD devices and stored in DRAM or main memory which may be a form of volatile memory used in the data storage system. In this manner, the cache page hash table may be populated using information stored on and read from the flash PD devices upon reboot. In connection with populating the cache page hash table, a hash table entry may be associated with a clean cache page or a dirty cache page. At step 1602, entry is assigned the first entry of the hash table. At step 1604, a determination is made as to whether the hash table has been completely populated. If step 1604 evaluates to yes, processing stops. If step 1604, evaluates to no, control proceeds to step 1606 to process the current entry. At step 1606, a determination is made as to whether the current entry is associated with a dirty cache page. If step 1606 evaluates to no meaning that the current entry of the hash table being populated is associated with a clean page, processing proceeds to step 1608 to populate the entry for the clean cache page in accordance with a single copy of the cached data. Such processing may include verifying that there is a page of cached data stored at the specified physical location on one of the flash PD devices and updating the entry to map or point to the specified physical location on the flash PD device containing the clean cached page of data. From step 1608, control proceeds to step 1602.

If step 1606 evaluates to yes indicating that the current entry of the hash table is associated with a dirty cache page, processing proceeds to step 1610 to populate the entry for the dirty cache page with information of the first copy of the dirty cached data from a first flash PD device. At this point, the entry in the hash table may be marked as having an intermediate state since the entry is not completely populated. Processing then proceeds to step 1612 to populate the entry with information for the second copy of the dirty cached page from a second flash PD device. Step 1612 processing may also include verifying that there is a copy of the page of cached data stored at the first and second flash PD devices. Once the entry has been populated and any such verification completed for both copies of the dirty cached page, the entry may be marked as valid and ready for use in connection with processing. From step 1612, control proceeds to step 1602.

The foregoing describes features that may be used in an embodiment in accordance with techniques herein in connection with a caching layer, such as an L2 caching layer, of physical storage devices. In at least one embodiment, the caching layer may include one or more flash PD devices. However, more generally, the caching layer in accordance with techniques herein may include other forms of fast memory where such memory may a form of non-volatile storage or also a form of volatile storage (e.g., such as form of solid state storage which is volatile). For example, techniques herein may also be used in connection with phase-change memory (PCM) devices, rather than flash PD devices, used for the L2 caching layer (e.g., element 312 of FIG. 3). PCM is also known in the art as PCME, PRAM, PCRAM, Ovonic Unified Memory, Chalcogenide RAM and C-RAM and is a type of non-volatile random-access memory.

Techniques herein provide advantages whereby the same number of flash PD devices may be used as the flash disk cache providing a larger capacity for storing cached data. The amount of increased different cached pages stored will vary depending on the read/write I/O mixture whereby write I/Os result in dirty cache pages until such data is destaged to the backend non-volatile storage of the PD layer 314. Techniques herein provide for storing two copies of dirty cache pages on two different flash PD devices to avoid risk of data loss upon the failure of one of the two flash PD devices. By increasing the number of different cached pages stored in the flash disk cache, increased I/O performance may be achieved. Additionally, data protection is still provided by selectively storing two copies of dirty cache pages but only storing a single copy of clean cache pages. It should be noted that in at least one embodiment in accordance with techniques herein, data may be stored on the multiple flash PD devices forming the flash disk cache in a RAID-0 configuration whereby data is stored in portions or stripes across the multiple flash PD devices without further parity information, redundancy, or fault tolerance.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of caching data comprising:
receiving a first write operation that writes first data to a first logical address;
storing the first data of the first write operation in a primary data cache, wherein the primary data cache and a secondary cache are included in a plurality of caching layers;
performing processing to destage the first data, located in the primary data cache with a status of dirty, from the primary data cache to non-volatile physical storage comprising:
determining, for the first logical address, that includes the first data stored in the primary data cache being destaged to non-volatile physical storage, whether a frequency of access of the first logical address exceeds a threshold level; and
responsive to determining that the first logical address, that includes the first data stored in the primary data cache being destaged to non-volatile physical storage, has a frequency exceeding the threshold level, performing first processing including:
storing the first data, located in the primary data cache with the status of dirty, from the primary data cache into the secondary cache as dirty cached data of the first logical address, wherein a first copy of the dirty cached data is stored in a first cache page on a first physical device of the secondary cache and a second copy of the dirty cached data is stored in a second cache page on a second physical device of the secondary cache, said first physical device and said second physical device being different physical devices, said first cache page and said second cache page each being marked as dirty indicating that data stored in said each cache page of the secondary cache is a more recent copy of data stored at the first logical address than other data stored on first non-volatile physical storage;
storing either the first copy of the dirty cached data or the second copy of the dirty cached data from the secondary cache to the first non-volatile storage; and
responsive to storing either the first copy of the dirty cached data or the second copy of the dirty cached data from the secondary cache to the first non-volatile storage, updating the status of the first data in the primary data cache from dirty to clean indicating that the first data stored in the primary data cache is synchronized with the first non-volatile storage providing back-end physical storage mapped to the first logical address; and
storing clean cached data of a second logical address in the secondary cache, wherein a single copy of the clean cached data is stored in a third cache page on physical storage of the secondary cache.

2. The method of claim 1, wherein the clean cached data is synchronized with data stored on second non-volatile physical storage providing back-end physical storage mapped to the second logical address.

3. The method of claim 1, wherein said first non-volatile storage is back-end physical storage that includes a physical storage portion mapped to the first logical address, and wherein said first non-volatile storage is not included in any of the plurality of caching layers.

4. The method of claim 1, wherein the first processing further comprises:
storing the first copy of the dirty cached data from the secondary cache to the first non-volatile storage; and
responsive to storing the first copy of the dirty cached data from the secondary cache to the first non-volatile storage, performing second processing including:
removing the second copy of the dirty cached data;
marking the second cache page storing the second copy as free and available for storing other cached data of the secondary cache; and
marking the first copy of the dirty data cached data as clean cached data indicating that the first cache page includes data synchronized with data stored on a portion of the first non-volatile storage providing back-end physical storage that is mapped to the first logical address.

5. The method of claim 1, wherein a cache hit is determined with respect to the secondary cache when an I/O operation directed to a logical address has its data stored in the secondary cache.

6. The method of claim 1, wherein a cache miss is determined with respect to the secondary cache when an I/O operation directed to a logical address does not have its data stored in the secondary cache.

7. The method of claim 1, further comprising:
receiving a write operation that stores first write data to the second logical address;
storing the first write data in the primary data cache;
performing processing to destage the first write data of the second logical address comprising:
determining whether there is a cache hit with respect to the secondary cache for the second logical address; and
responsive to determining there is a cache hit with respect to the secondary cache for the second logical address, performing second processing comprising:
storing the first write data in the third cache page;
storing the first write data in a fourth cache page of the secondary cache, wherein said third cache page and said fourth cache page are each on a different physical storage device of the secondary cache;
marking the first write data stored in the third cache page and the fourth cache page as second dirty cached data indicating that the first write data stored in the third and the fourth cache pages of the secondary cache is a more recent copy of data stored at second logical address than other data stored on second non-volatile physical storage providing back-end physical storage mapped to the second logical address.

8. The method of claim 1, wherein the secondary cache is a flash disk cache including a plurality of flash-based storage devices.

9. The method of claim 8, wherein the first physical device including the first copy of the dirty cached data is a first of the plurality of flash-based storage devices, and the second physical device including the second copy of the dirty cached data is a second of the plurality of flash-based devices different from the first flash-based storage device.

10. The method of claim 1, wherein each cache page of the secondary cache stores an amount of data denoted by a first amount, and wherein the method further comprises:
   receiving a second write operation that writes second data to a target logical address;
   determining whether the second data has a size larger than the first amount;
   responsive to determining the second data has a size larger than the first amount, partitioning the second write operation into a plurality of write operations each writing a different portion of the second data wherein said different portion has a size that is equal to or less than the first amount; and
   processing each of the plurality of write operations and, for each of said plurality of write operations, determining whether to cache a portion of the second data, as written by said each write operation, in the secondary cache.

11. The method of claim 1, further comprising:
   receiving write data to store in the secondary cache;
   determining that there are no free pages in the secondary cache;
   responsive to determining there are no free pages in the secondary cache, selecting a particular cache page of the secondary cache wherein the particular cache page includes clean cache data synchronized with the first non-volatile storage; and
   storing the write data to the selected particular cache page.

12. The method of claim 11, wherein said selecting selects the particular cache page in accordance with an age associated with current data stored in the particular cache page prior to storing the write data.

13. The method of claim 12, wherein the particular cache page is a least recently used cache page of a plurality of cache pages.

14. A non-transitory computer readable medium comprising code stored thereon that, when executed, performs a method of caching data comprising:
   receiving a first write operation that writes first data to a first logical address;
   storing the first data of the first write operation in a primary data cache, wherein the primary data cache and a secondary cache are included in a plurality of caching layers;
   performing processing to destage the first data, located in the primary data cache with a status of dirty, from the primary data cache to non-volatile physical storage comprising:
      determining, for the first logical address, that includes the first data stored in the primary data cache being destaged to non-volatile physical storage, whether a frequency of access of the first logical address exceeds a threshold level; and
      responsive to determining that the first logical address, that includes the first data stored in the primary data cache being destaged to non-volatile physical storage, has a frequency exceeding the threshold level, performing first processing including:
         storing the first data, located in the primary data cache with the status of dirty, from the primary data cache into the secondary cache as dirty cached data of the first logical address, wherein a first copy of the dirty cached data is stored in a first cache page on a first physical device of the secondary cache and a second copy of the dirty cached data is stored in a second cache page on a second physical device of the secondary cache, said first physical device and said second physical device being different physical devices, said first cache page and said second cache page each being marked as dirty indicating that data stored in said each cache page of the secondary cache is a more recent copy of data stored at the first logical address than other data stored on first non-volatile physical storage;
         storing either the first copy of the dirty cached data or the second copy of the dirty cached data from the secondary cache to the first non-volatile storage; and
         responsive to storing either the first copy of the dirty cached data or the second copy of the dirty cached data from the secondary cache to the first non-volatile storage, updating the status of the first data in the primary data cache from dirty to clean indicating that the first data stored in the primary data cache is synchronized with the first non-volatile storage providing back-end physical storage mapped to the first logical address; and
      storing clean cached data of a second logical address in the secondary cache, wherein a single copy of the clean cached data is stored in a third cache page on physical storage of the secondary cache.

15. The method of claim 1, wherein said processing to destage the first data from the primary data cache to non-volatile physical storage further includes:
   responsive to determining the first logical address, that includes the first data stored in the primary data cache being destaged to non-volatile storage, does not have a frequency of access exceeding the threshold level, writing the first data of the first logical address directly from the primary data cache to the first non-volatile storage without storing the first data of the first logical device in the secondary cache.

16. The method of claim 1, wherein processing of a read miss operation to obtain read data includes:
   determining that the read data is not stored in the primary data cache and not stored in the secondary cache;
   reading the read data from non-volatile physical storage; and
   storing the read data in the primary data cache and not storing the read data in the secondary data cache.

17. The non-transitory computer readable medium of claim 14, wherein the clean cached data is synchronized with data stored on second non-volatile physical storage providing back-end physical storage mapped to the second logical address.

18. The non-transitory computer readable medium of claim 14, wherein said first non-volatile storage is back-end physical storage that includes a physical storage portion mapped to the first logical address, and wherein said first non-volatile storage is not included in any of the plurality of caching layers.

19. The non-transitory computer readable medium of claim 14, wherein the first processing further comprises:
   storing the first copy of the dirty cached data from the secondary cache to the first non-volatile storage; and
   responsive to storing the first copy of the dirty cached data from the secondary cache to the first non-volatile storage, performing second processing including:
      removing the second copy of the dirty cached data;

marking the second cache page storing the second copy as free and available for storing other cached data of the secondary cache; and marking the first copy of the dirty data cached data as clean cached data indicating that the first cache page includes data synchronized with data stored on a portion of the first non-volatile storage providing back-end physical storage that is mapped to the first logical address.

20. A system comprising:
one or more processors; and
a memory comprising code stored thereon that, when executed by at least a first of the one or more processors, performs a method of caching data comprising:
  receiving a first write operation that writes first data to a first logical address;
  storing the first data of the first write operation in a primary data cache, wherein the primary data cache and a secondary cache are included in a plurality of caching layers;
  performing processing to destage the first data, located in the primary data cache with a status of dirty, from the primary data cache to non-volatile physical storage comprising:
    determining, for the first logical address, that includes the first data stored in the primary data cache being destaged to non-volatile physical storage, whether a frequency of access of the first logical address exceeds a threshold level; and
    responsive to determining that the first logical address, that includes the first data stored in the primary data cache being destaged to non-volatile physical storage, has a frequency exceeding the threshold level, performing first processing including:
      storing the first data, located in the primary data cache with the status of dirty, from the primary data cache into the secondary cache as dirty cached data of the first logical address, wherein a first copy of the dirty cached data is stored in a first cache page on a first physical device of the secondary cache and a second copy of the dirty cached data is stored in a second cache page on a second physical device of the secondary cache, said first physical device and said second physical device being different physical devices, said first cache page and said second cache page each being marked as dirty indicating that data stored in said each cache page of the secondary cache is a more recent copy of data stored at the first logical address than other data stored on first non-volatile physical storage;
      storing either the first copy of the dirty cached data or the second copy of the dirty cached data from the secondary cache to the first non-volatile storage; and
      responsive to storing either the first copy of the dirty cached data or the second copy of the dirty cached data from the secondary cache to the first non-volatile storage, updating the status of the first data in the primary data cache from dirty to clean indicating that the first data stored in the primary data cache is synchronized with the first non-volatile storage providing back-end physical storage mapped to the first logical address; and
  storing clean cached data of a second logical address in the secondary cache, wherein a single copy of the clean cached data is stored in a third cache page on physical storage of the secondary cache.

* * * * *

UNITED STATES PATENT AND TRADEMARK OFFICE
CERTIFICATE OF CORRECTION

PATENT NO. : 10,620,850 B1  
APPLICATION NO. : 15/086390  
DATED : April 14, 2020  
INVENTOR(S) : Xu et al.

Page 1 of 1

It is certified that error appears in the above-identified patent and that said Letters Patent is hereby corrected as shown below:

In the Claims

Column 26, Line 57:
Claim 7, the phrase "stored at second logical" should read -- stored at the second logical --

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*